Jan. 9, 1962 B. F. AMBROSIO ETAL 3,016,423

TRANSDUCER FOR TRANSMISSION SYSTEMS

Filed Oct. 5, 1959 12 Sheets-Sheet 1

INVENTORS:
David Rutland
Biagio F. Ambrosio
By Smyth & Roston
Attorneys

TRANSDUCER FOR TRANSMISSION SYSTEMS

Filed Oct. 5, 1959 12 Sheets-Sheet 2

INVENTORS:
David Rutland
Biagio F. Ambrosio

By Smyth & Roston
Attorneys.

TRANSDUCER FOR TRANSMISSION SYSTEMS
Filed Oct. 5, 1959 12 Sheets-Sheet 3
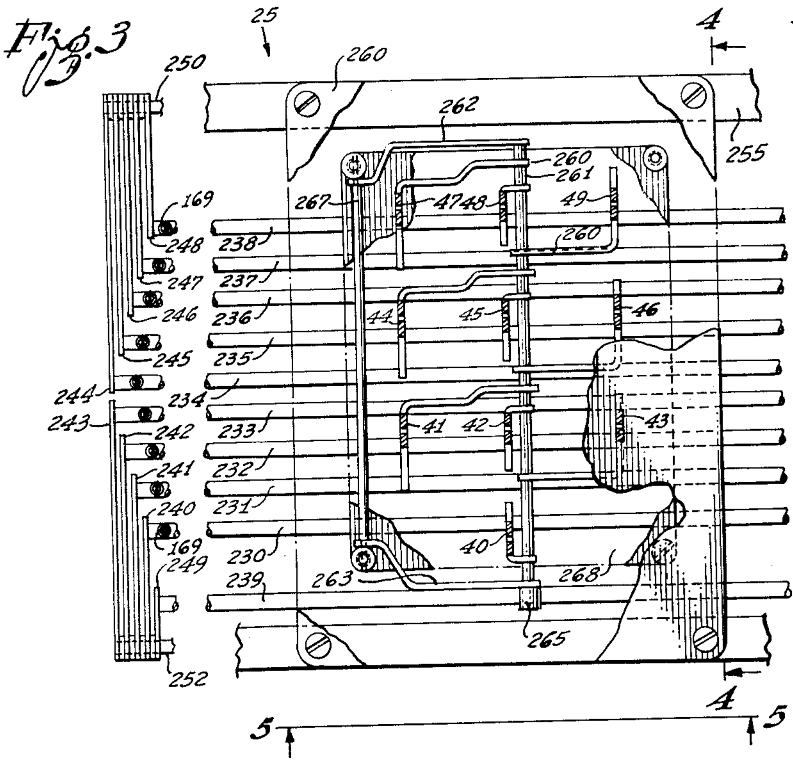
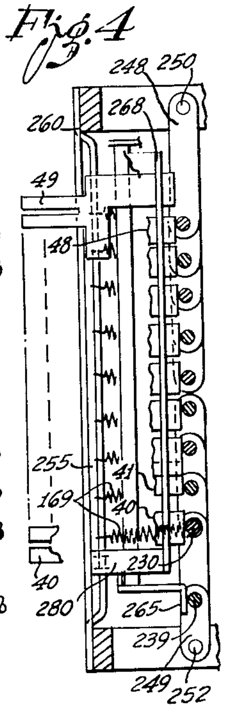
FIG. 3, FIG. 4
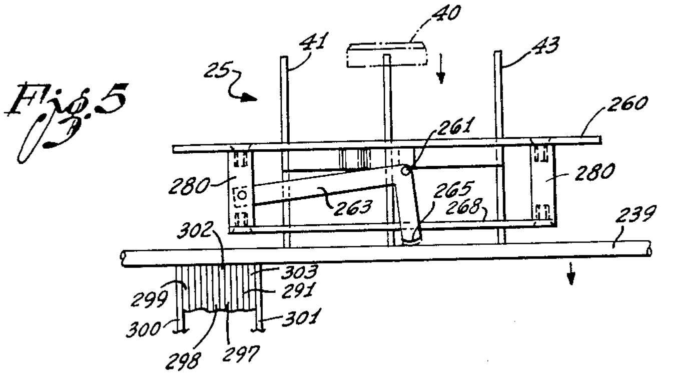
FIG. 5
INVENTORS:
David Rutland
Biagio F. Ambrosio
By Smyth & Roston
Attorneys Jan. 9, 1962 B. F. AMBROSIO ETAL 3,016,423

TRANSDUCER FOR TRANSMISSION SYSTEMS

Filed Oct. 5, 1959 12 Sheets-Sheet 4

INVENTORS:
David Rutland
Biagio F. Ambrosio

By Smyth & Roston

Attorneys,

INVENTORS:
David Rutland
Biagio F. Ambrosio
By Smyth & Roston
Attorneys.

Jan. 9, 1962 B. F. AMBROSIO ETAL 3,016,423

TRANSDUCER FOR TRANSMISSION SYSTEMS

Filed Oct. 5, 1959 12 Sheets-Sheet 6

INVENTORS:
David Rutland
Biagio F. Ambrosio

By Smyth & Roston
Attorneys,

TRANSDUCER FOR TRANSMISSION SYSTEMS

Filed Oct. 5, 1959

12 Sheets-Sheet 7

INVENTORS:
David Rutland
Biagio F. Ambrosio
By Smyth & Roston
Attorneys,

TRANSDUCER FOR TRANSMISSION SYSTEMS

Filed Oct. 5, 1959 12 Sheets-Sheet 8

INVENTORS:
David Rutland
Biagio F. Ambrosio
By Smyth & Roston
Attorneys,

Jan. 9, 1962 B. F. AMBROSIO ETAL 3,016,423

TRANSDUCER FOR TRANSMISSION SYSTEMS

Filed Oct. 5, 1959 12 Sheets-Sheet 9

INVENTORS:
David Rutland
Biagio F. Ambrosio
By Smyth & Roston
Attorneys.

TRANSDUCER FOR TRANSMISSION SYSTEMS

Filed Oct. 5, 1959 12 Sheets-Sheet 10

INVENTORS:
David Rutland
Biagio F. Ambrosio
By Smyth & Roston
Attorneys,

TRANSDUCER FOR TRANSMISSION SYSTEMS

Filed Oct. 5, 1959 12 Sheets-Sheet 11

INVENTORS:
David Rutland
Biagio F. Ambrosia
By Smyth & Roston
Attorneys,

TRANSDUCER FOR TRANSMISSION SYSTEMS

Filed Oct. 5, 1959 12 Sheets-Sheet 12

INVENTORS:
David Rutland
Biagio F. Ambrosio
By Smyth & Roston
Attorneys 3,016,423
TRANSDUCER FOR TRANSMISSION SYSTEMS
Biagio F. Ambrosio, Tarzana, and David Rutland, Sherman Oaks, Calif., assignors, by mesne assignments, to The Electrada Corporation, Culver City, Calif., a corporation of Delaware
Filed Oct. 5, 1959, Ser. No. 844,549
14 Claims. (Cl. 178—79)

This invention relates to a transducer for providing coded electrical signals and, more particularly, to a key-operated data transmitter for te etypewriter systems.

The conventional teletypewriter code is a five-unit permutation code in which each unit is binary, being one of two values. The two values are generally referred to as a mark and a space. With such a code, it is possible to obtain 32 different combinations, 26 of which are assigned to the letters of the alphabet, leaving one code or combination for the idle condition and five codes for functions such as space, figure shift, bell, etc. To transmit figures or numbers instead of letters, the numerical message is preceded by the functional code for the figure shift. At the teleprinter, or teletypewriter receiver, the coded message is converted to printed text.

Both the conventional teletypewriter receivers and transmitters are quite bulky and heavy and are, therefore, usually permanently located at transmitting and receiving stations. There are many applications, however, in which it is desirable to transmit messages at different times from any one of many different locations. A portable transmitter which is readily carried and utilized by one man, for example, has considerable utility for military applications in the field.

Conventional teletypewriters successively transmit the teletypewriter codes as keys are successively operated. Storage facilities to check the accuracy of the keyboard operation before transmission of the coded message are not provided. Under adverse conditions such as encountered by military personnel in the field, keyboard errors occur more frequently than in the conventional stationary systems. The accuracy of the transmitted message, on the other hand, which may be coded, is often more critical.

In a specific illustrative embodiment of this invention, a highly portable data transmitter for converting key operations to teletypewriter signals is provided. The transmitter includes mechanical storage apparatus which stores the information corresponding to the successively operated keys and provides a readably visible indication of the stored information to the operator. After a number of pieces of information have been stored and the accuracy of the key operations checked by the operator, the stored information is successively transmitted utilizing electromagnetic scanning means.

The storage apparatus includes a number of information members in the form of rotatable code wheels which are successively rotated as the code keys are successively operated. The code wheels ar rotated through angular displacements related to the information to be stored. Each of the wheels includes a peripheral coded surface and a peripheral indicating surface. As each wheel is positioned by the code key operation, one portion of the peripheral coded surface is positioned adjacent the path of a movable scanning head, and one portion of the indicating surface is positioned adjacent a message window. By viewing the message window, the operator can readily check the accuracy of the key operation. When each of the code wheels has been set, a transmission key may be operated to initiate the movement of the scanning head along the aligned portions of the peripheral coded surfaces. The scanning head successively scans the aligned portions to read out the stored information.

Each of the peripheral coded surfaces has a number of magnetic code bars which generate pulses in the scanning head when the head passes adjacent thereto. A unique combination of pulses is generated for each code wheel position. The combinations of pulses are utilized to generate a five-unit teletypewriter coded signal. One pulse is provided by the code wheel whenever the teletypewriter code changes from a mark to a space or vice versa. The pulses from the scanning head are introduced to electronic circuitry which converts them to a frequency modulated signal with the modulation being in accordance with the teletypewriter code.

Features of this invention relate to the provision of the mechanical storage apparatus which stores the key-operated information. The data transmitter includes batteries which are utilized when the stored key-operated information is transmitted. Positioning the code wheels to store the information does not require the use of the batteries. The batteries are therefore, utilized only during the relatively brief transmission intervals.

In addition to the codes which are stored and thereafter transmitted, means are provided for instantaneously transmitting functional codes representing space, bell, figure shift, etc. The functional code may be transmitted before or after the digital information is stored in the mechanical storage apparatus. After the stored message is transmitted, a manual reset operation returns the data transmitter to normal. The functional code may be transmitted before the reset operation if the stored information has not been transmitted.

When a functional code key is operated, a code wheel having magnetic projections is rotated through one revolution adjacent a stationary scanning head. The functional code key also determines the position of the code wheel with respect to the head so that a different combination of projections passes adjacent the head for different codes. The pulses developed by the stationary head are introduced to the electronic circuitry for conversion to the frequency modulated output signal.

The speed and spacing of the magnetic projections on the functional code determines the transmission rate of the functionally coded output signal, and the speed of the digital scanning head determines the transmission rate of the digitally coded output signal. These variables are elected so that the transmission rates for both digital and functional transmission are identical.

Still further features of this invention relate to provision of a muting signal whenever the batteries are coupled to the electronic circuitry and transmission is not in progress. When either the functional or digital transmission is initiated the muting signal is removed to permit the frequency modulation of the output signal.

Further features and advantages of this invention will become apparent upon consideration of the following description when read in conjunction with the drawing wherein:

FIGURE 3 is a top view of the operating key mechanism of the digital keyboard of the data transmitter of this invention;

FIGURE 4 is a side view of the operating key mechanism of the digital keyboard illustrated in FIGURE 3;

FIGURE 5 is a front view of the operating key mechanism of the digital keyboard illustrated in FIGURE 3;

*General description*

Figure 1:
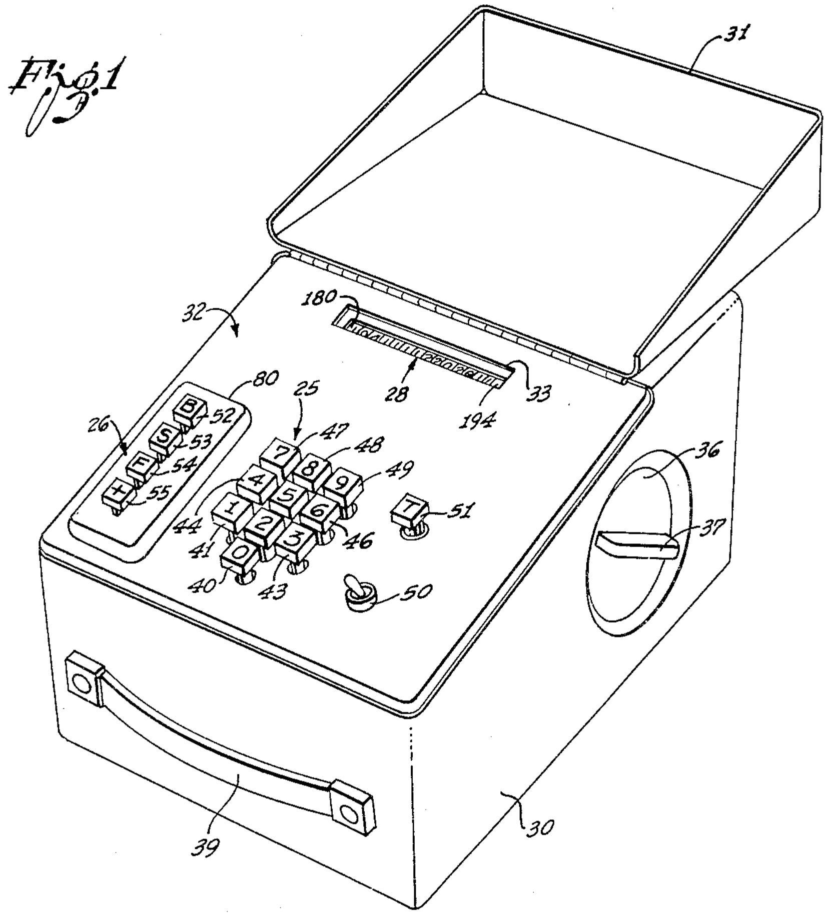
FIGURE 1 is a pictorial view of the data transmitter of this invention illustrating the control panel.

The digital data transmitter of this invention, illustrated pictorially in FIGURE 1, may be utilized to transmit coded information along a conventional field telephone line, or to modulate the carrier of a radio transmitter (for example, type RT–176/PRC–10). The digital data transmitter has a key-operatd input and its output is in the form of an alternating voltage, the frequency of which varies according to the standard space-mark teletypewriter code. The receiving equipment, which receives the teletypewriter signals and which forms no part of this invention, may be conventional teletype receiving equipment utilized at telegraph and telephone central stations.

Referring first to FIGURE 1, the data transmitter of this invention is shown having a case 30 which supports a control panel 32 and a protective lid 31. The protective lid 31 is rotated to cover the control panel 32 and is maintained in its closed position when the data transmitter is not in use. When the lid 31 is closed, it moves an on-off switch 50 to its off position. The data transmitter is portable and may be readily carried utilizing a strap 39 which is mounted on the case 30. When the data transmitter is to be operated, the protective lead 31 is rotated from the control panel 32.

The control panel 32 includes a digital keyboard 25 and a functional keyboard 26. The digital keyboard 25 includes ten keys 40 through 49 which may be arranged in the convenitonal ten-key adding machine arrangement. Though the data transmitter is shown and described with reference to digital information, it is readily apparent that letters or other symbols may be transmitted as well. Moreover, though ten keys 40 through 49 are illustrated in the keyboard 25, any number of keys, more or less, may be utilized. The keyboard 25 is successively operated to store up to 15 digits in a mechanical storage apparatus 28. The storage apparatus 28 includes 15 digital code wheels 180 through 194, portions of which are readily viewable through a message window 33 in the control panel 32. Though the present invention is described with reference to a storage capacity of 15 symbols, a capacity of more or less than 15 may be provided.

As the digital keyboard 25 is successively operated, the code wheels 180 through 194 are successively rotated to position numerals on their peripheral surfaces adjacent the message window 33. The digital code transmission is not instantaneous as it is stored in the storage apparatus 28 in order to enable the operator to check the accuracy of the selected message and the key operation. The selected message is, in this manner, mechanically stored by the storage apparatus 28 until the operator desires to transmit the digital message.

In order to initiate the digital transmission, an on-off switch 50 is moved to its on position and a digital transmission key 51, which is marked T on the control panel 32, is depressed. The digital transmission key 51 is maintained in its depressed or operated position by the operator until an indication is provided at the right end of the message window 33 that the digital transmission is complete. The indication is in the form of a white indicator tab, not shown in FIGURE 1, which is moved into view adjacent the end of the message window 33 at the termination of the digital transmission interval. Thereafter, the data transmitter can be reset utilizing a reset disc 36 having a handle 37 which is rotated in a counter-clockwise direction. The disc returns the transmission equipment, not shown in FIGURE 1, and also the code wheels 80 through 94 of the storage apparatus 28 to their original positions. The disc 36 returns to its original position when released by the operator.

As described above, the control panel 32 includes the digital keyboard 25 and also a functional keyboard 26. The functional keyboard 26 includes three fnnction keys 52, 53 and 54 and a functional transmission key 55. The keys 52, through 53 and 54 on the control panel 32 are marked respectively "B" for bell, "S" for space and "F" for figure shift. Though particular functions are, in this manner, indicated, it is readily apparent that any other functions may be utilized with each of the keys 52, 53 and 54, and that any number of functional keys may be provided either more or less than three. The functional code transmission may be accomplished either before or after the digital information is stored in the apparatus 28. Once, however, the digital information is transmitted, it is necessary to reset the data transmitter before another transmission sequence may be initiated either of the functional or the digital codes.

In order to initiate the functional code transmission, the on-off switch 50 is moved to its on position and the functional transmission key 55, which is marked "+" on the control panel 32, is depressed. When the key 55 is depressed, it energizes a motor 146 (FIGURE 2) and it unlocks the functional code keys 52, 53 and 54. With the transmission key 55 in its depressed or operated position, the required functional key 52, 53 or 54 is then also depressed to initiate the functional code transmission.

Instantaneous transmission is provided when one of the code keys 52, 53 and 54 is depressed. Both the depressed transmission and code keys return to their original positions when released. It is unnecessary to reset the data transmitter after the functional code transmission so that additional functional codes or the digital code may be transmitted thereafter without a reset operation.

Figure 2:
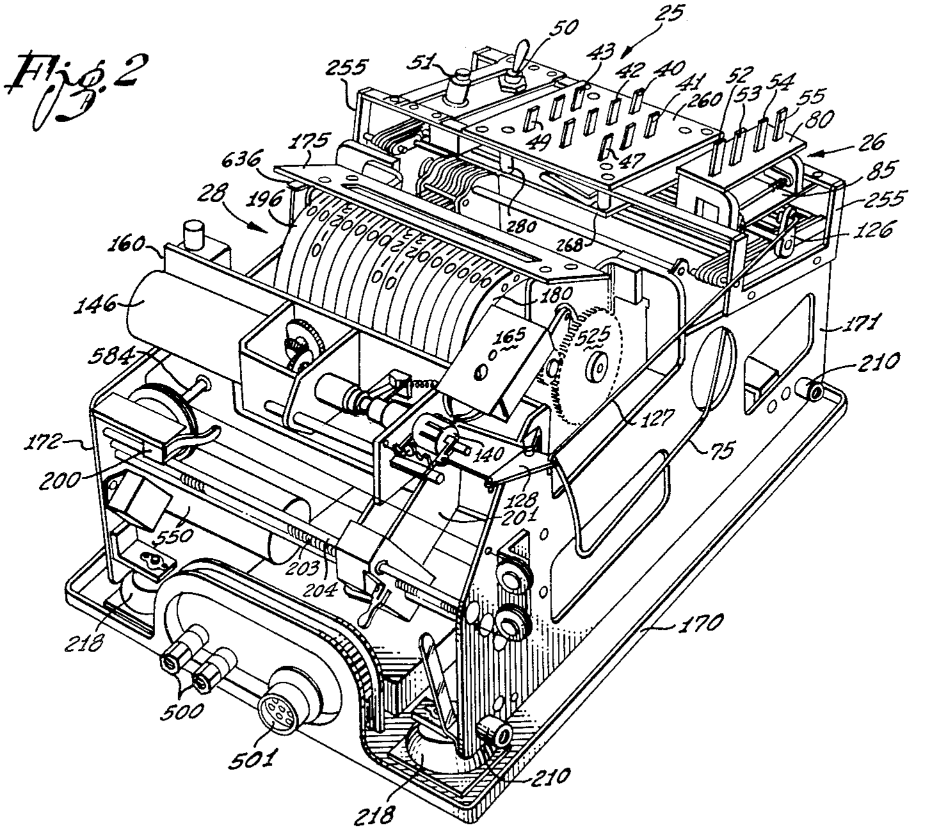
FIGURE 2 is a pictorial view of the digital transmitter of this invention with the case and control panel removed when viewed at an angle from the rear.

Both the digital and functional code transmission is provided utilizing magnetic scanning equipment not shown in FIGURE 1. Referring briefly to FIGURE 2, the functional code scanning equipment utilizes a code wheel 140 which is rotated by the motor 146 adjacent a stationary magnetic scanning head 165 when the functional transmission is initiated. The digital scanning equipment includes a movable magnetic scanning head 201 which is moved by a lead screw 203 adjacent the bottom of the code wheels 180 through 196, inclusive, when the digital transmission key 51 is depressed. When the reset disc 36 in FIGURE 1 is rotated to reset the data transmitter, it also returns the digital magnetic head 201 to the right in FIGURE 2 back to its original position.

Though not shown in FIGURES 1 and 2, the code wheels 180 through 196 are coded along their bottom peripheral surfaces so as to generate pulses in the moving magnetic head 201. The functional code wheel 140 also is coded to generate pulses in the functional magnetic head 165 as it rotates adjacent thereto. The pulses developed in the heads 201 and 165 are converted to alternating voltages having a frequency which is determined by the developed pulses. The varying frequency output is to the output jacks 500 and to the output connector 501 shown in FIGURE 2 for transmission to the receiver. The jacks 500 are utilized to provide the output signals over telephone lines and the connector 501 is utilized to provide the output signals to a radio transmitter.

Each of the functions briefly described above is hereinafter described in detail. The functional code selection and transmission is first described, then the digital code selection and storage is described and finally the digital code transmission is described.

*Functional code selection and transmission*

Figures 25, 26:
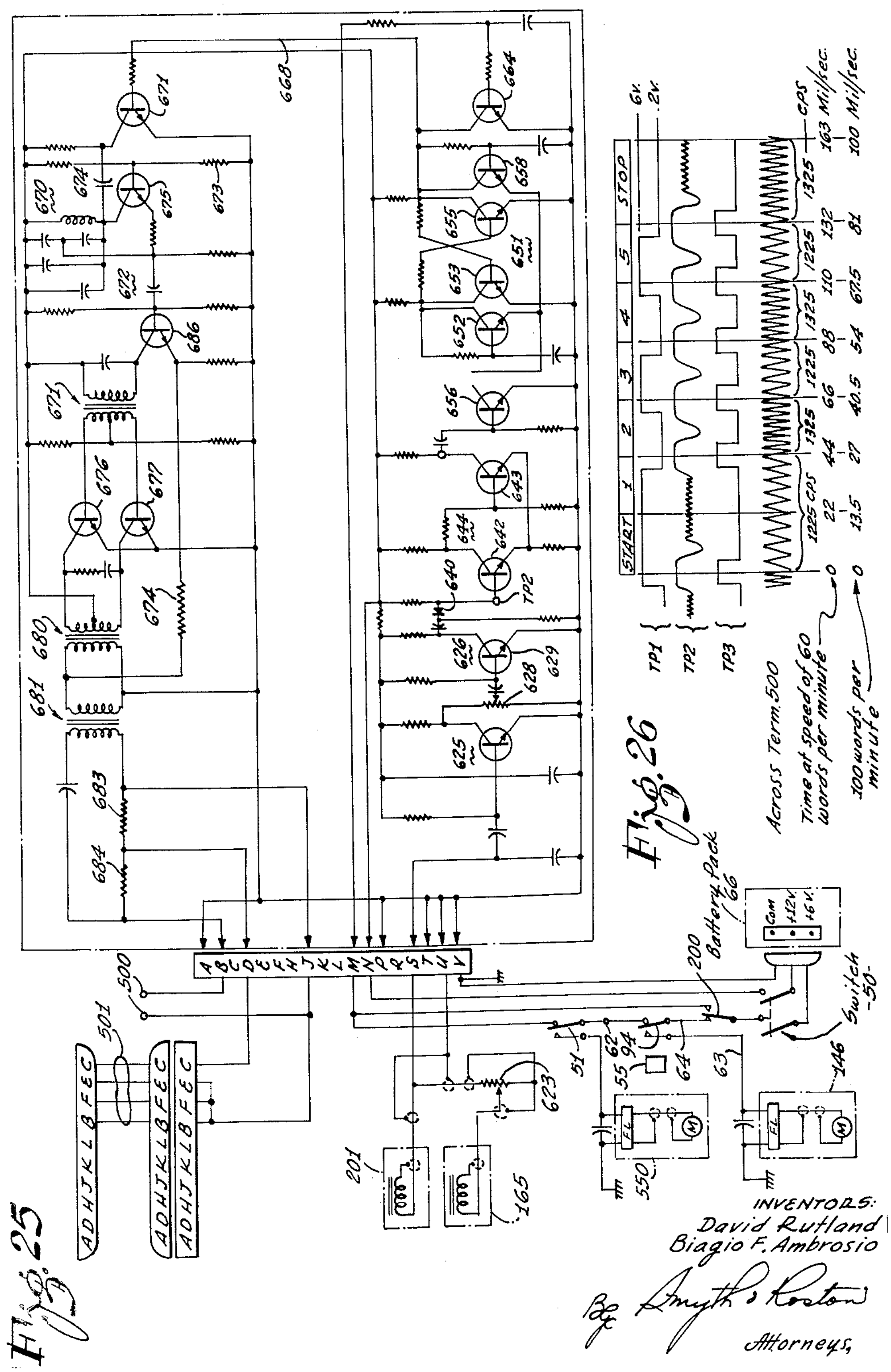
FIGURE 25 is a circuit representation of the data transmitter of this invention.
FIGURE 26 is a series of curves illustrating the operation of the data transmitter.

In order to initiate the functional code transmission, the on-off switch 50 on the control panel 32 is moved to its on position to establish a connection from a battery pack 66 which is depicted in FIGURE 25. In FIGURE 2, the battery pack 66, not shown, is supported on a base plate 170 of the data transmitter case 30 (FIGURE 1). Actually, the case 30 fits over the base plate 170 and is attached to two frame members 171 and 172, depicted in FIGURE 2, by means of four internally threaded bushings 210.

Figures 9, 10, 11:
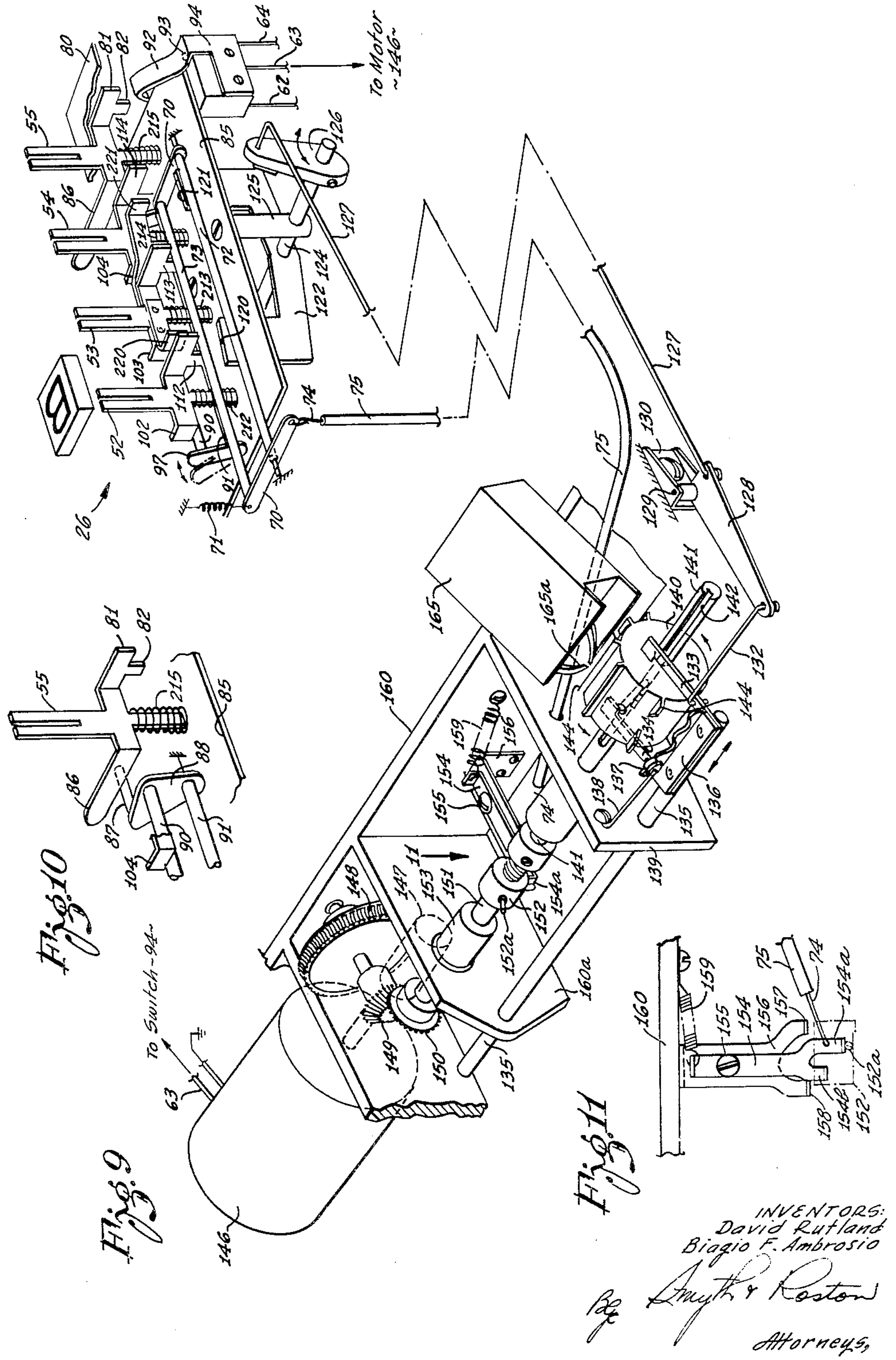
FIGURE 9 is a partially exploded pictorial view of the key mechanism of the functional keyboard and the functional code transmission equipment controlled thereby.
FIGURE 10 is a detailed pictorial view of a portion of the key mechanism of the functional keyboard.
FIGURE 11 is a top view of the clutch control mechanism included in the functional code transmission equipment depicted in FIGURE 9.

Referring now to FIGURE 25, which is a circuit representation of the data transmitter of this invention, when the switch 50 is moved to its on position, connections are established from the +12 and +6 volt terminals of the battery pack 66. With the switch 50 in its on condition, the +6 volt potential is provided from the battery pack 66 through the switch 50, a normal limit switch 200, and a lead 64, to a normal functional transmission switch 94. The functional transmission switch 94, which is also shown in FIGURE 9 in the right portion of the partially exploded view therein, is operated when the functional transmission key 55 is depressed. The lead 64 to the switch 94 is the lead energized by the +6 volt potential when the switch 50 is operated to its on position.

With the switch 50 in its on position, a muting signal is provided through the switch 50 to a transistor flip-flop circuit 651. The flip-flop circuit 651, which is described in detail as part of the description of the digital transmission sequence, is bistable having a "space" and a "mark" condition. The terms "space" and "mark" are descriptive of the elements of the conventional teletypewriter code. The +6 volt muting signal is provided through the on-off switch 50, the normal functional switch 94, and the normal digital switch 51, which was briefly described above to the base electrode of an NPN junction transistor 664. The switch 50 also couples the +12 volt potential from the battery pack 66 to energize the various circuit arrangements depicted in FIGURE 25 including the flip-flop circuit 651.

The +6 volt muting signal at the base electrode of the transistor 664 forward biases the base-to-emitter junction causing the transistor 664 to become conductive. When the transistor 664 becomes conductive, its collector-to-emitter junction presents a low impedance between a lead 668 and a ground connection. The lead 668 is the output lead from the space-mark, flip-flop circuit 651. The reduction of collector-to-emitter impedance of the transistor 664 effectively clamps the flip-flop circuit 651 in its space condition. The circuit 651 includes two NPN transistors 653 and 655 which are alternatively conductive. When the transistor 664 is conductive, it introduces a relatively positive potential at the base electrode of the transistor 653, to maintain the transistor 653 conductive and the transistor 655 non-conductive regardless of any signals which may be generated by either of two scanning heads 201 and 165. With the flip-flop circuit 651 locked in its space condition in this manner, the output of the data transmitter at the cable connector 501 and terminals 500 is a continuous tone having a constant frequency of 1325 cycles per second.

The operation of the flip-flop circuit 651 and the rest of the transistor circuit arrangements depicted in FIGURE 25 to provide the continuous 1325 cycle tone and to provide the frequency modulated output signal during either the functional or digital transmission is hereinafter described.

To initiate the functional code transmission, the functional transmission key 55, shown in FIGURES 9 and 10 as well as in FIGURES 1 and 2, is depressed and then with the key 55 depressed, one of the functional keys 52, 53 and 54 is depressed. When the key 55 is depressed, it unlocks the functional code keys 52, 53 and 54, it energizes the functional code motor 146 and it interrupts the muting signal to the flip-flop circuit 651. The motor 146 is energized by the key 55 before the keys 52, 53 and 54 are depressed in order to bring the motor 146 up to speed before transmission is actually initiated.

When the key 55 is depressed or operated, it compresses a helical spring 215 against a platform 85 so that when the operator releases the key 55, the spring 215 restores it to its original position. The keys 52, 53 and 54 also support respectively similar helical springs 212, 213 and 214. As illustrated in FIGURE 2, the platform 85 is directly beneath a platform 80 through which the four functional keys 52 through 55, inclusive, extend. The upper platform 80 is slightly higher than the surface of the control panel 32 depicted in FIGURE 1. The four keys, 52 through 55 are movable in slots in the platform 80. The platform 80 is supported on the platform 85 which is in turn supported on a frame member 255 (FIGURE 2) which also supports the digital keyboard 25. The frame member 255 and a frame member 160 are attached to the two vertical frame members 171 and 172. The members 255, 160, 171 and 172 together form a rigid assembly for supporting the various components of the data transmitter. The two vertical members 171 and 172 are mounted by four shock absorbers 218 on the base platform 170.

When the functional transmission key 55 is depressed, it unlocks the functional code keys 52, 53 and 54. More specifically, as illustrated in FIGURES 9 and 10, when the transmission key 55 is depressed, its horizontal extension 86 rotates a latching shaft 90 in a counter-clockwise direction about the longitudinal axis of a shaft 91. The extension 86 bears against a finger 87 of a link 88 which connects the two shafts 90 and 91. A link 97 shown in FIGURE 9 couples the other two ends of the shafts 90 and 91. The latching shaft 90 is normally positioned directly beneath three horizontal extensions 102, 103 and 104 of the code keys 52, 53 and 54. Because of the latching shaft 90, the code keys 52, 53 and 54 are locked and cannot be readily depressed. With the latching shaft 90 rotated away from the extensions 102, 103 and 104 by the transmission key 55, the functional code keys 52, 53 and 54 are unlatched and ready for operation. The latching shaft 90 is urged in a clockwise direction by resilient means, not shown, so that it returns to its original position when the transmission key 55 is released.

As indicated above, when the functional transmission key 55 is depressed, it also energizes the functional motor 146 and interrupts the muting signal. The motor 146 is a small direct-current motor, illustratively having a speed of 3600 revolutions per minute and of the type SO–18430 manufactured by the Globe Industries Incorporated. As the key 55 is moved down by the operator, a horizontal extension 81 (FIGURE 9) of the key 55 moves a resilient member 92 against the actuating control 93 of the microswitch 94. When the functional transmission key 55 is operated it, therefore, in turn actuates the transmission switch 94 to establish a connection from the +6 volt source to a lead 63 which is coupled to the functional motor 146. The motor 146 includes a filter FL (FIGURE 25) which eliminates electrical interference. The switching operation is illustrated as indicated above in the circuit representation of FIGURE 25.

The +6 volt muting signal is removed from the base electrode of the transistor 664 to permit the operation of the flip-flop circuit 651 when either the functional switch 94 or the digital switch 51 is operated. When the transistor 664 becomes non-conductive, the flip-flop circuit 651 remains in its space condition but when a positive input pulse is thereafter introduced thereto, it can now trigger to its mark condition.

Referring again to FIGURE 9, when the functional code motor 146 is energized, it drives a gear train including a worm gear 147, a gear 148, and a pair of bevel gears 149 and 150 to rotate a shaft 151. The shaft 151 is rotated in a bearing 153 that is supported on an extension 160*a* of the frame member 160.

The shaft 151 is coupled to a shaft 141 by a single revolution clutch 152 which, however, is engaged by a latch 154 at the time the key 55 is depressed. With the clutch 152 engaged by the latch 154, the shaft 141 is not rotated by the motor 146. As is hereinafter described, when the latch 154 releases the clutch 152, the shaft 141 is rotated through one revolution. The latch 154 is released when one of the code keys 152, 153 and 154 is depressed.

The clutch latch 154 is rotatable on a screw pivot 155 that is mounted on a bracket 156 and the bracket 156 is affixed to the frame member 160. The right distal end of the latch 154 is urged in a clockwise direction by a coil spring 159 that is coupled between the right digital end of the latch 154 and the frame member 160. As shown particularly in FIGURE 11, the other end of the latch 154 is bifurcated, having two fingers 154*a* and 154*b*. As indicated somewhat in FIGURES 9 and 11, the ends of the fingers 154*a* and 154*b* are bent upwardly with the finger 154*a* being positioned to engage a stop 152*a* of the clutch 152. At the time the transmission key 55 is depressed, the stop 152*a* of the clutch 152 is engaged by the finger 154*a* of the latch 154 so that the shaft 141 which is coupled to the other end of the clutch 152 does not rotate. The angle of rotation of the latch 154 about the pivot screw 155 is limited by the bifurcated end of the bracket 156. The bifurcated end of the bracket 156 has two fingers 157 and 158 which are also bent upwardly so as to limit the movement of the latch 154. With all three of the function keys 52, 53 and 54 normal, the latch 154 is in its clockwise position against the finger 158 of the bracket 156. When one of the three keys 52, 53 and 54 is depressed, the latch 154 is rotated in a counter-clockwise direction, viewed in FIGURE 11, against the finger 157 of the bracket 156 to release the clutch 152 so that the shaft 141 rotates with the shaft 151.

The shaft 141 is supported by an extension 139 which may be welded to or integral with the frame member 160. The shaft 141 has a longitudinal slot 142 extending from one end toward the extension 139. The slotted end of the shaft 141 slidingly supports the functional code wheel 140 which was briefly mentioned above. The code wheel 140, which is keyed to and rotates with the shaft 141 when the clutch 152 is released, includes a number of suitably spaced projections 144 made of a suitable magnetic material which provide for the functional code. The projections 144 may illustratively be made of soft iron.

In order to release the single revolution clutch 152 so as to rotate the code wheel 140 through one revolution, one of the three keys 52, 53 and 54 is depressed during the time that the functional transmission key 55 is depressed. When any one of the three keys 52, 53 and 54 is depressed, it performs two functions: first, it longitudinally positions the code wheel 140 on the slotted shaft 141; and second, it releases the clutch 152 to rotate the code wheel 140. The positioning linkage from the keys 52, 53 and 54 to the code wheel 140 includes a rotatable U-shaped member 122 which is affixed to and supported by a rotatable shaft 124. The shaft 124 is rotatably supported by bushings 125 which are in turn affixed to the bottom of the platform 85 of the functional key arrangement 26. When the key 52 is depressed, it rotates the U-shaped member 122 in a counter-clockwise direction, and when the key 54 is depressed, it rotates the member 122 in a clockwise direction. When the central key 53 is depressed, it restores the U-shaped member 122 to a balanced position between its two extreme angular positions determined respectively by the keys 52 and 54.

More specifically, the key 52 includes a horizontal extension 112, the lower portion of which engages the edge 120 of the U-shaped member 122. If the key 52 is depressed, it, therefore, is forced against the edge 120 to rotate the member 122 in a counter-clockwise direction. The key 54 includes a similar horizontal extension 114 having a lower or stop portion which abuts against the edge 121 of the member 122 when the key 54 is depressed. When the key 54 is depressed it, therefore, rotates the member 122 in a clockwise direction. The key 53, which is centrally located between the two keys 52 and 54, includes a horizontal extension 113 which is similar to the horizontal extensions 112 and 114 of the keys 52 and 54. The extension 113, however, does not engage either of the edges 120 and 121 of the member 122 when the key 53 is depressed. The key 53, however, includes two additional horizontal extensions 220 and 221 which respectively engage the edges 120 and 121 of the member 122 when the key 53 is depressed. Depending upon the angular position of the U-shaped member 122 when the key 53 is depressed, one or the other of its two edges 120 and 121 will be engaged by the associated horizontal extension of the key 53 causing the U-shaped member 122 to return to its middle position with its two edges 120 and 121 horizontally aligned.

The angular position of the U-shaped member 122 under control of the three functional keys 52, 53 and 54 in turn determines the angular position of a lever 126 which is affixed to and rotatable with the shaft 124. As described above, the shaft 124 rotates with the U-shaped member 122 when any one of the keys 52, 53 and 54 is depressed. The lever 126, in this manner, has three distinct angular positions associated respectively with the three keys 52, 53 and 54. The lever 126 assumes an angular position in accordance with which one of the three functional keys 52 through 54 is depressed. The lever 126 rotatably supports a thin rod 127 which, as shown in FIGURE 2, is positioned along the side of the data transmitter. The other end of the rod 127 is pivoted on a rotatable link 128.

Referring again to FIGURE 9, the link 128 is rotatably supported by a pin 129 on a bracket 130. The angular positon of the link 128 is, in this manner, determined through a linkage including a rod 127 and the lever 126 by the keys 52, 53 and 54. The rotatable link 128 is coupled by a rod 132 to an arm 133 of a detent frame 136. The arm 133 and a second arm 134 of the detent frame 136 are positioned at opposite sides of the functional code wheel 140 so that as the detent frame 130 moves under control of the rod 132 and the rotatable link 128, it moves the functional code wheel 140 therewith. The detent frame 136 is affixed to a slidable rod 135 which is movably supported by extensions 139 and 160*a* of the frame member 160. The detent frame 136 includes a vertically positioned arcuate extension having three notches, one for each of the three longitudinal positions of the code wheel 140. A detent wheel 137 which is mounted on a spring 138 engages the arcuate extension of the detent frame 136. The spring 138, which is attached to the extension 139 of the frame member 160, urges the wheel 137 against the arcuate extension.

In this manner, the code wheel 140 is moved to one of three longitudinal positions adjacent a magnetic head 165 in accordance with the operation of the three functional keys 52, 53 and 54 and effectively latched there by the detent wheel 137. The key 52, for example, rotates the U-shaped member 122 in a counter-clockwise direction to force the rotatable link 128 in a clockwise direction and, therefore, to position the code wheel 140 in its position nearest to the extension 139. The key 54 functions to move the code wheel 140 to its position furthest from the extension 139, and the key 53 functions to position the code wheel 140 to an intermediate position therebetween.

As described above, in addition to positioning the code wheel 140, the keys 52, 53 and 54 also function to release the clutch 152. The respective horizontal extensions 112, 113 and 114 of the keys 52, 53 and 54 engage a rod 73 which is supported between two arms 70. When any one of the keys 52, 53 and 54 is depressed, it moves the shaft 73 in a counter-clockwise direction when viewed from the left in FIGURE 9 about the rotatable shaft 72. The left arm 70 extends a spring 71 so that when the depressed key is returned to its normal position, the shaft 73 is also rotated back to its original position. When the arm 70 is rotated, it moves a flexible cable 74 in a sleeve 75 to rotate the clutch latch 154. As shown particularly in FIGURE 11, the flexible cable 74 is attached to the finger 154*a* of the rotatable latch 154. The stop 152*a* of the clutch 152 which normally engages the finger 154*a* is free to rotate when the latch 154 is rotated in a counter-clockwise direction by the cable 74. With the clutch 152 released, the shaft 141 and the functional code wheel 140 therewith are rotated by the motor 146 through one revolution. After one revolution, the stop 152*a* of the clutch is again engaged by latch 154.

As the functional code wheel 140 rotates, the protrusions 144 rotate adjacent the magnets 165*a* of the scanning head 165. Each of the three longitudinal positions of the code wheel 140 provides for a different and unique combination of protrusions 144 passing adjacent the magnets 165*a* of the head 165 during the revolution of the wheel 140. The magnets 165*a* are part of two soft iron pole pieces, not shown, which form a part of the scanning head 165. The magnets 165*a* form an air gap therebetween through which magnetic flux developed by the head 165 passes. The protrusions 144 vary the reluctance for the fringing flux so that a pulse is developed by the head 165 each time a protrusion 144 passes adjacent the fingers 165*a*.

The protrusions 144 are arranged on the code wheel 140 to provide for the conventional teletypewriter code for the three functional codes provided thereby.

Actually, as is hereinafter described, the code wheel 140 provides one pulse to initiate the transmission and then one pulse each time the output teletypewriter code is to be changed from a space to a mark indication or vice versa. The pulses generated by the functional scanning head 165 are similar to those developed by the digital scanning head 201 except that different selective teletypewriter codes are generated. The particular coding and the electronic circuitry for processing the pulses generated by both heads 165 and 201 are hereinafter described as part of the description of the digital transmission sequence.

The transmission speed of the functional code for a particular rotation speed of the code wheel 140 depends upon the spacing of the protrusions 144. Illustratively, the transmission speed may be 60 or 100 words or codes per minute depending upon the spacing of the protrusion 144.

In order to change the transmission speed, a different code wheel 140 may be utilized or means not shown may be provided for changing the rotating speed of the wheel 140. The code wheel 140 is readily changed by disengaging the rod 132 (FIGURE 9) from the arm 133 of the detent frame 136. The detent frame 136 may then be moved to the right to free the code wheel 140 from the slotted shaft 141.

As long as the transmission key 55 remains depressed, the functional keys 52, 53 and 54 may be successively operated to transmit a functional code. Each time one of the keys 52 through 54 is operated, a code is transmitted. The code key may then be released returning to normal without releasing the transmission key 55. If another or the same functional code key is then depressed, a functional code is again transmitted.

*Digital selection and registration*

As described above, the functional code may be transmitted either before or after the digital information is stored without requiring a reset operation. The digital information is mechanically stored in storage apparatus 28, shown in FIGURE 2, under control of the digital keyboard 25. The keyboard 25 includes the ten keys 40 through 49 which are arranged in a configuration similar to that utilized for conventional adding machines for office use. When one of the keys 40 through 49 is depressed, or operated, it positions one of the fifteen code wheels 180 through 196 of the storage apparatus 28. As the keys 40 through 49 are successively operated, the code wheels 180 through 196 are successively positioned. With 15 code wheels 180 through 196 the storage apparatus 28 has a capacity for storing fifteen digits under control of the keyboard 25. The storage apparatus 28, including the code wheels 180 through 194 is described in detail after the keyboard linkages are described. The storage is mechanical so that the on-off switch 50 may be in its off position during the selection and registration of the fifteen digits.

Figure 7:
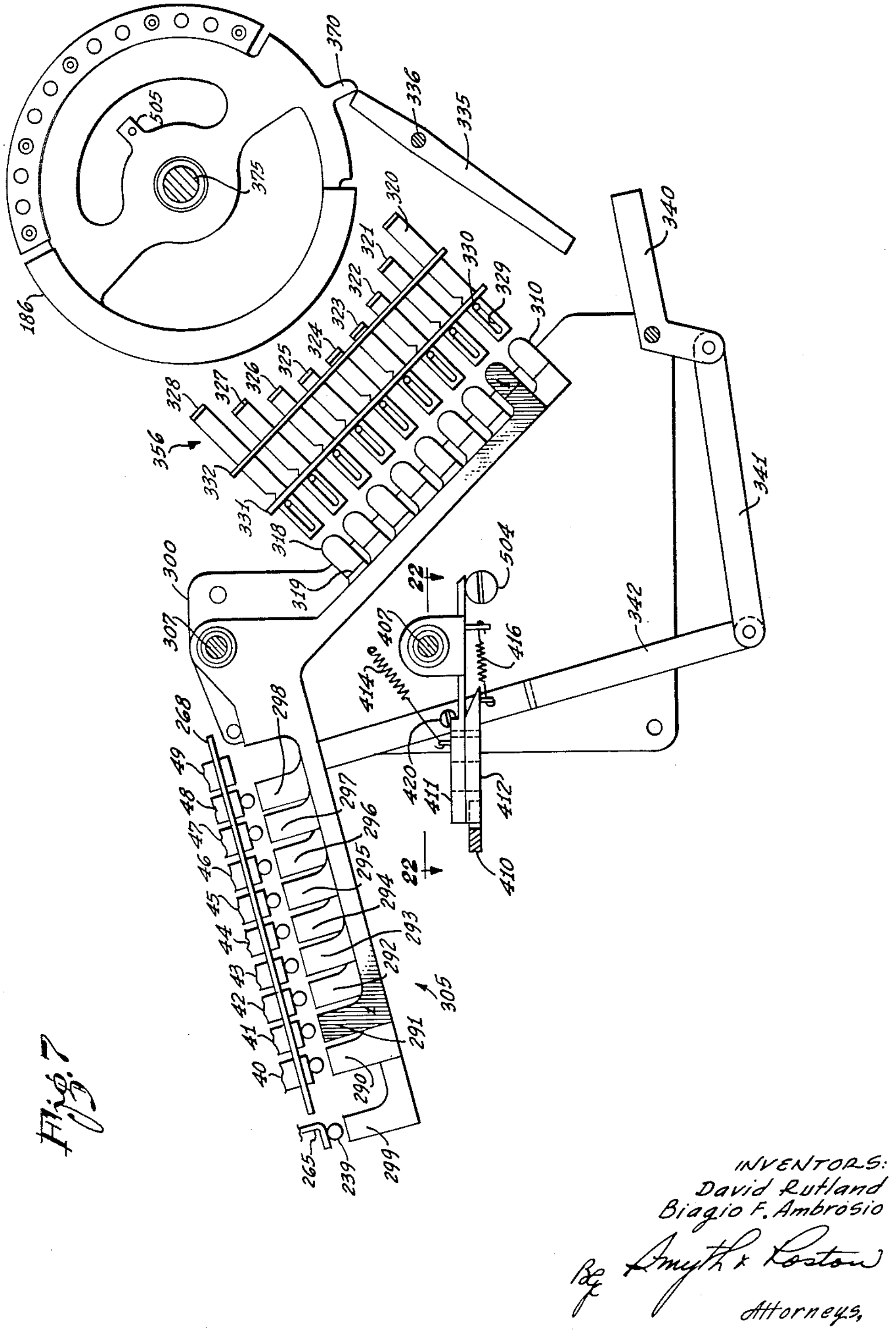
FIGURE 7 is a sectional view of the operating key mechanism of the digital keyboard and the digital storage apparatus taken along lines 7—7 of FIGURE 6 with the digital keyboard normal.
Figure 8:
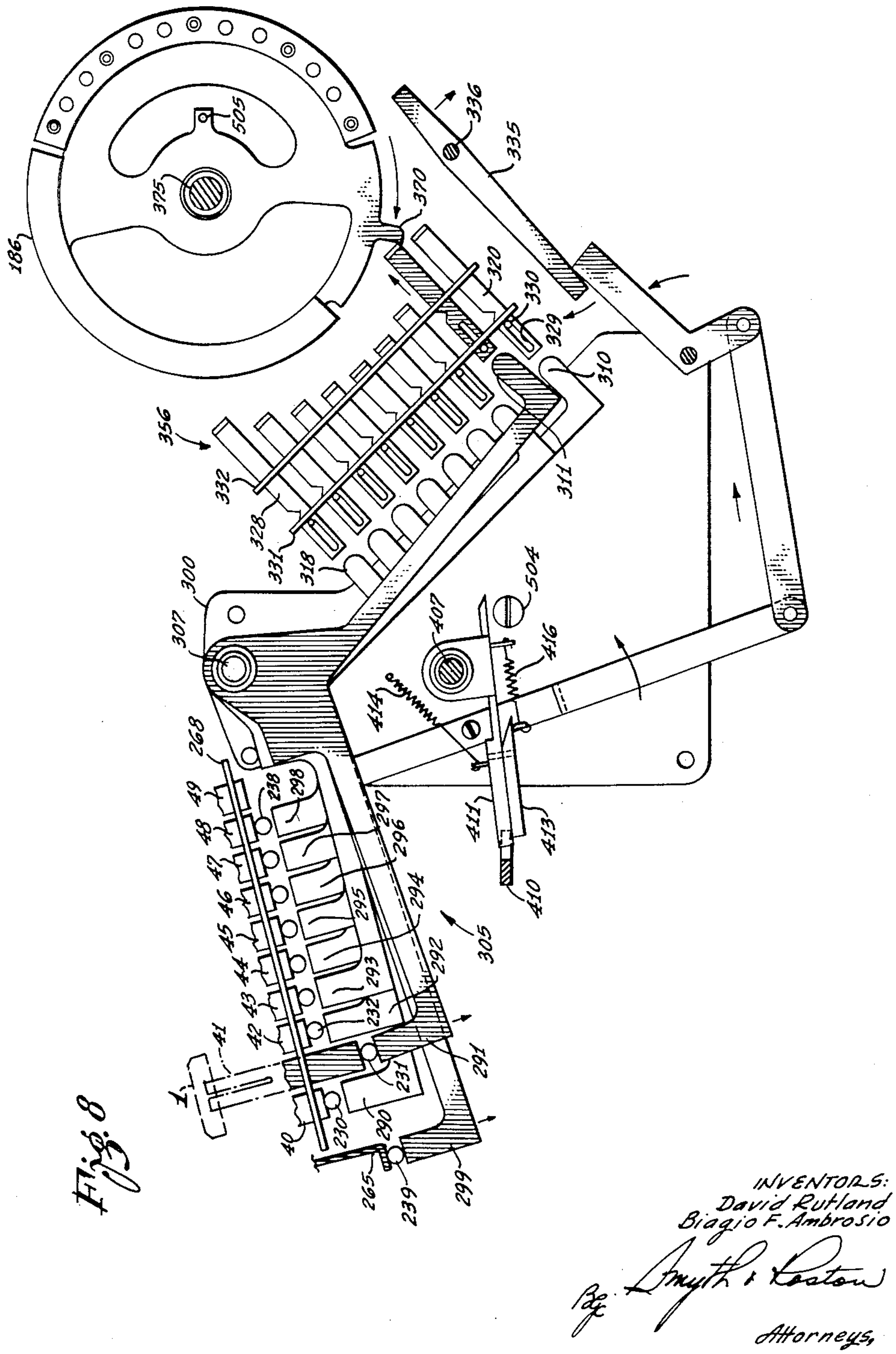
FIGURE 8 is a sectional view of the operating key mechanism of the digital keyboard and the digital storage apparatus also taken along lines 7—7 of FIGURE 6 with one of the digital keys in its operated position.

As shown in FIGURES 3 through 5, the ten keys 40 through 49 of the digital keyboard 25 pass through a stationary plate 260 which is mounted on the frame member 255. The frame member 255 is attached to the vertical frame members 171 and 172 (FIGURE 2). When one of the keys 40 through 49 is depressed, it moves in the plate 260 and also in slots in another plate 268 which is attached by spacers 280 to the plate 260. Positioned beneath the plate 268 are nine selector key bars 230 through 238, inclusive, which are respectively associated with the digital keys 40 through 48. Each of the keys 40 through 48 has a lower portion positioned just above its associated selector key bar so that when it is depressed, it moves the associated bar downwardly. For example, when the key 41 is depressed, its lower end pushes against the key bar 231. This operation is shown particularly in FIGURE 4 and also in FIGURES 7 and 8. FIGURE 7 illustrates the normal arrangement of the keys 40 through 48 and their associated key bars 230 through 238. In FIGURE 8, the key 41 is shown in its depressed position. As illustrated therein, when the key 41 is depressed, it moves its associated key bar 231 in a downward direction.

Figure 6:
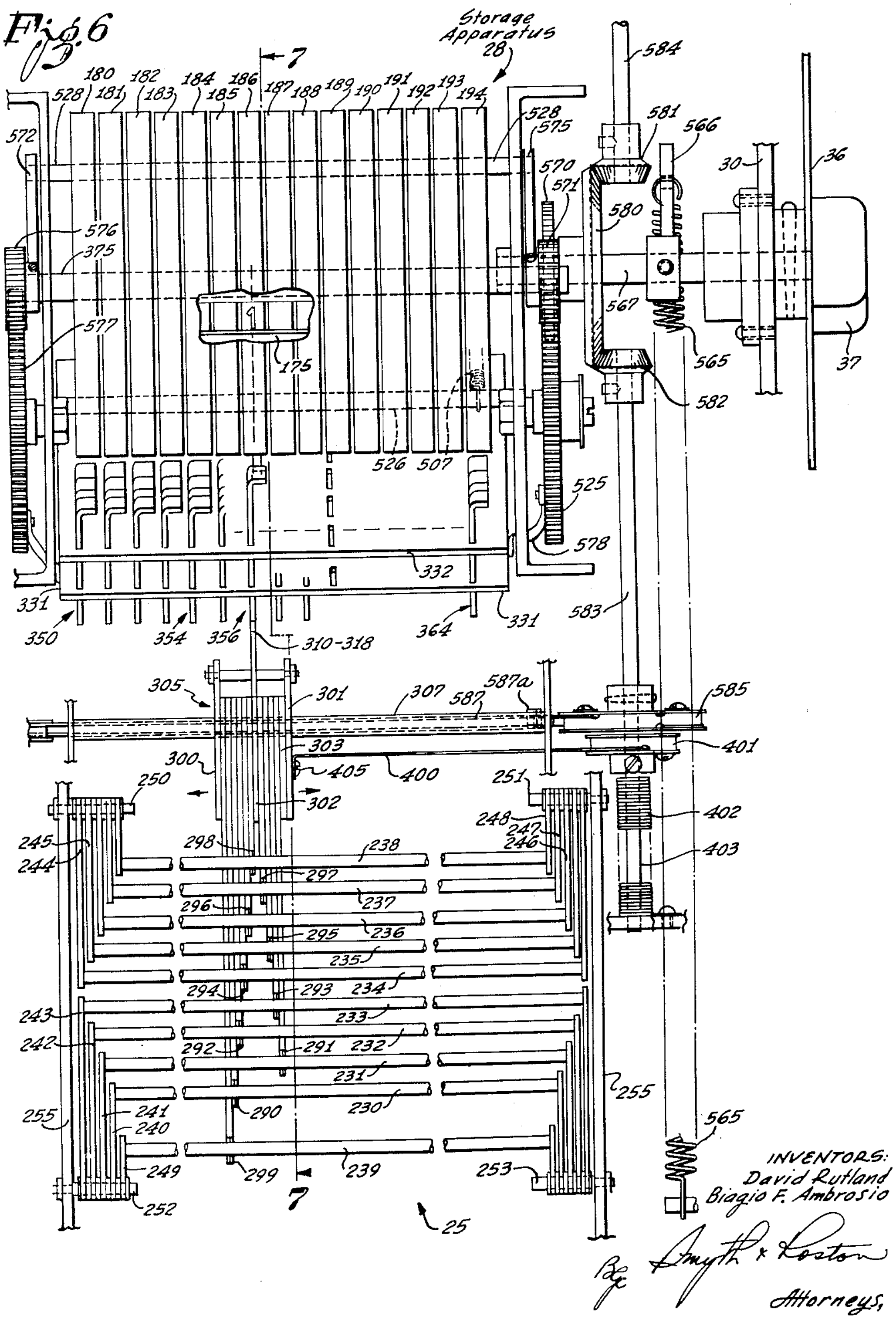
FIGURE 6 is a top view of the operating key mechanism of the digital keyboard and of the digital storage apparatus.

Referring back to FIGURE 3, and also to FIGURE 6, which illustrates the linkages controlled by the digital keyboard 25, the key bars 230 through 238 and also a key bar 239 are rotatable about one or the other of two axes. One axis is through a pair of bearings 250 and 251, and the other axis is through a pair of bearings 252 and 253. The bars 230 through 239 are respectively supported by pairs of arms 240 through 249. The arms 240 through 243, inclusive, and the arms 249 are rotatably supported on the bearings 252 and 253, and the arms 244 through 248, inclusive, are rotatably supported on the bearings 250 and 251. As shown in FIGURE 4, each of the key bars 230 through 239 is coupled by a coil spring 269 to the frame member 255 so that when the operator releases a depressed key it is returned by the rotated key bar to its original position.

Referring again briefly to FIGURES 7 and 8, the bottom portion of the key 49 is not positioned over the key bar 239 whereas the bottom portions of the keys 40 through 48 are respectively positioned adjacent the associated key bars 230 through 238. When the key 49 is depressed, however, it functions to move the key bar 239. The linkage from the key 49 to the selector shaft 239 is depicted in FIGURES 3 through 5, inclusive. As illustrated therein and particularly in FIGURE 3, a horizontal extension 260 of the key 49 is positioned over a movable shaft 261. The shaft 261 is supported by two arms 262 on a stationary shaft 267. When the key 49 is depressed, it rotates the shaft 261 about the longitudinal axis of the shaft 267. The end of the arm 263 supports an extension 265 which may be integral therein. The arm 265, as shown in FIGURES 3 through 5, 7 and 8, is positioned directly over the key bar 239. When the key 49 is depressed, it therefore rotates the shaft 261 and the arm 263 therewith to push the extension 265 against the key bar 239.

Referring again to FIGURE 3, the shaft 261 is rotated when any one of the keys 40 through 48 is depressed as well as when the key 49 is depressed. Each of the keys 40 through 48 includes a horizontal extension 260 which is positioned directly above the shaft 261. When any of the keys 40 through 48 is depressed it, therefore, moves the key bar 239 as well as its associated key bar. For example, as illustrated in FIGURE 8, when the key 41 is depressed, it moves the key bars 231 and 239. Each of the keys 40 through 48, therefore, moves two of the key bars, one of which is the bar 239, but the key 49 only moves the key bar 239. The key bar 239 is, in this manner, moved when any one of the keys 40 through 49 of the keyboard 25 is depressed.

Positioned directly below the ten bars 230 through 239 is a step or travelling selector assembly 305 which is depicted particularly in FIGURE 6. As illustrated in FIGURE 6, the assembly 305 includes nine selection levers 290 through 298 and a catch lever 299 respectively positioned directly under the ten key bars 230 through 239. Each time that one of the digital keys 40 through 49 is depressed, the travelling selector assembly 305 is operated, and when the digital key is released the travelling selector assembly 305 steps to the right as shown in FIGURE 6 adjacent the storage apparatus 28. More particularly, the selector assembly 305 is successively stepped adjacent 15 sets 350 through 364 of stop pins which are respectively associated with the fifteen code wheels 180 through 194. Each of the sets 350 through 364 includes nine stop pins 320 through 328 illustrated in FIGURES 7 and 8. For the first digit, the travelling selector assembly 305 is positioned adjacent the set 350. In the position shown in FIGURE 6, the travelling selector assembly 305 is positioned adjacent the set 356 which is associated with the code wheel 186. For this position of the assembly 305, when the digital key 41 is depressed, it functions, as is further hereinafter described, to rotatably position the code wheel 186. When the key 41 is released, the selector assembly 305 is stepped adjacent the set 357 so that when a digital key is thereafter depressed, the code wheel 187 is angularly positioned.

The operation of the travelling selector assembly 305 is illustrated particularly in FIGURES 7 and 8 wherein, as described above, FIGURE 7 illustrates the digital keyboard 25 in a normal condition whereas FIGURE 8 illustrates the digital keyboard 25 with the key 41 depressed. FIGURES 7 and 8 are both sectional views taken along lines 7—7 in FIGURE 6 with the travelling selector assembly 305 being positioned on two shafts 307 and 407 adjacent the set 356 which is associated with the code wheel 186. There is only one set of levers 290 through 299 in the travelling assembly 305 but there are fifteen different sets 350 through 364 each of which includes nine stop pins 320 through 328.

The stop pins 320 through 328 each include a longitudinal slot 329 which slidingly engages a stationary pin 330. The stop pins 320 through 328 are supported by a stationary member 332 and a movable reset member 331 which is utilized, as is hereinafter described, to return any displaced stop pins 320 through 328 to their original normal condition after the transmission of the digital information.

When any one of the digital keys 40 through 49 is depressed, it moves its associated key bar to operate the travelling selector assembly 305. The levers 290 through 298 of the travelling selector assembly 305 are respectively positioned under the key bars 230 through 238 so that when one of the key bars is depressed, it causes the associated selection lever to rotate slightly in a counterclockwise direction about the shaft 307. As illustrated particularly in FIGURE 8, when the digital key 41 is depressed, the selection lever 291 and the catch lever 299 are both rotated or pivoted slightly about the stationary shaft 307. The selection levers 290 through 298 include respectively arms 310 through 318 which are positioned respectively adjacent the stop pins 320 through 328, inclusive. When the travelling selector assembly 304 is stepped adjacent the set 356, the arms 310 through 318, inclusive, are aligned with the slidable stop pins 320 through 328 of the set 356. At each of the fifteen positions of the assembly 305, the arms 310 through 318 are positioned adjacent a different set of stop pins.

When viewed from above, as in FIGURE 6, the arms 310 through 318 are shown aligned in a single line adjacent the set 356. Each of the levers 290 through 298 is bent so that though they are at different transverse positions at the key bars 230 through 238 they are aligned at the set 256. In FIGURE 7, the levers are bent at 319 at right angles to provide for the linear alignment adjacent the set 256 of stop pins. The catch lever 299 is not provided with an associated stop pin as there are ten levers 290 through 299 but only nine stop pins 320 through 328 in each of the 15 sets 350 through 364.

As illustrated in FIGURE 8, when one of the stop pins 320 through 328 is moved to its operated position by the travelling selector assembly 305, it functions as a stop for the associated code wheel 186. The code wheel 186 and each of the code wheels 180 through 185 and 187 through 194 as well, include a latching or stop member 370. As illustrated in FIGURE 7, the member 370 is normally engaged by a rotatable wheel catch 335. There is one wheel catch 335 for each of the code wheels 180 through 196. The wheel catch 335 is rotated about a pivot 336 by the catch lever 299 of the assembly 305 when the keyboard 25 is operated. Each of the code wheels 180 through 194 includes resilient means which may be in the form of a coil spring, not shown in FIGURES 7 and 8, and which urges the wheel in a clockwise direction. One coil spring 507, depicted in FIGURE 15, functions to urge each of the code wheels 180 through 194 in a clockwise direction.

When the wheel catch 335 is rotated in a clockwise direction to the position indicated in FIGURE 8 by the catch lever 299, it releases the associated code wheel 186. The wheel catch 335 is operated by a linkage including a rotatable member 340 and a link 341 which are both part of the travelling selector assembly 305. The link 341 is coupled between one end of the rotatable member 340 and the leg 342 of the catch lever 299. When the catch lever 299 is rotated in a counter-clockwise direction against the wheel catch 335, it causes it to release the code wheel 186.

When the code wheel 186 is released, it rotates in a clockwise direction, as depicted in FIGURE 8, until the stop member 370 is engaged by the stop pin 321. As described above, the stop pin 321 was moved into the path of the member 370 by the digital key 41. The stop pin 321 remains in its operated condition and the code disc 186 remains rotated in position with the member 370 against the pin 321 after the selector assembly 305 is stepped to the next set 357 to position the adjacent code wheel 187.

As described above, all the selector levers 290 through 298 and the catch lever 299 are part of the travelling selector assembly 305 which slides on the two selector shafts 307 and 407. As shown in FIGURE 6, the selector assembly 305 is pulled by a cable 400 which is attached to a bracket 301 by means of a screw 405. The bracket 301 and a similar bracket 300 form the opposite sides of the travelling assembly 305. The levers 290 through 299 are positioned between the brackets 300 and 301. The cable 400 is attached to a pulley 401 which is tensioned by a torsion spring 402. Both the pulley 401 and the spring 402 are mounted on a rotatable shaft 403.

Also housed in the travelling selector assembly 305 is a latch mechanism depicted particularly in FIGURES 21 through 24, inclusive. The latching mechanism, which includes two latching members 411 and 413, and spring loaded to rest on a large eccentric 504 (FIGURES 7 and 8), is pivoted on the selector shaft 407. When any one of the digital keys 40 through 49 is depressed, it rotates the catch lever 299 in a counter-clockwise direction about the shaft 307 to depress the latching mechanism. A small eccentric 420, which is mounted on the arm 342 of the catch lever 299, bears against the upper latch member 411 causing it to rotate about the selector shaft 407. When the latching member 411 is depressed in this manner, it tensions a coil spring 414 so that when the catch lever 299 is returned to its original position, the latching member 411 rotates up with the eccentric 420.

Figures 21, 22, 23:
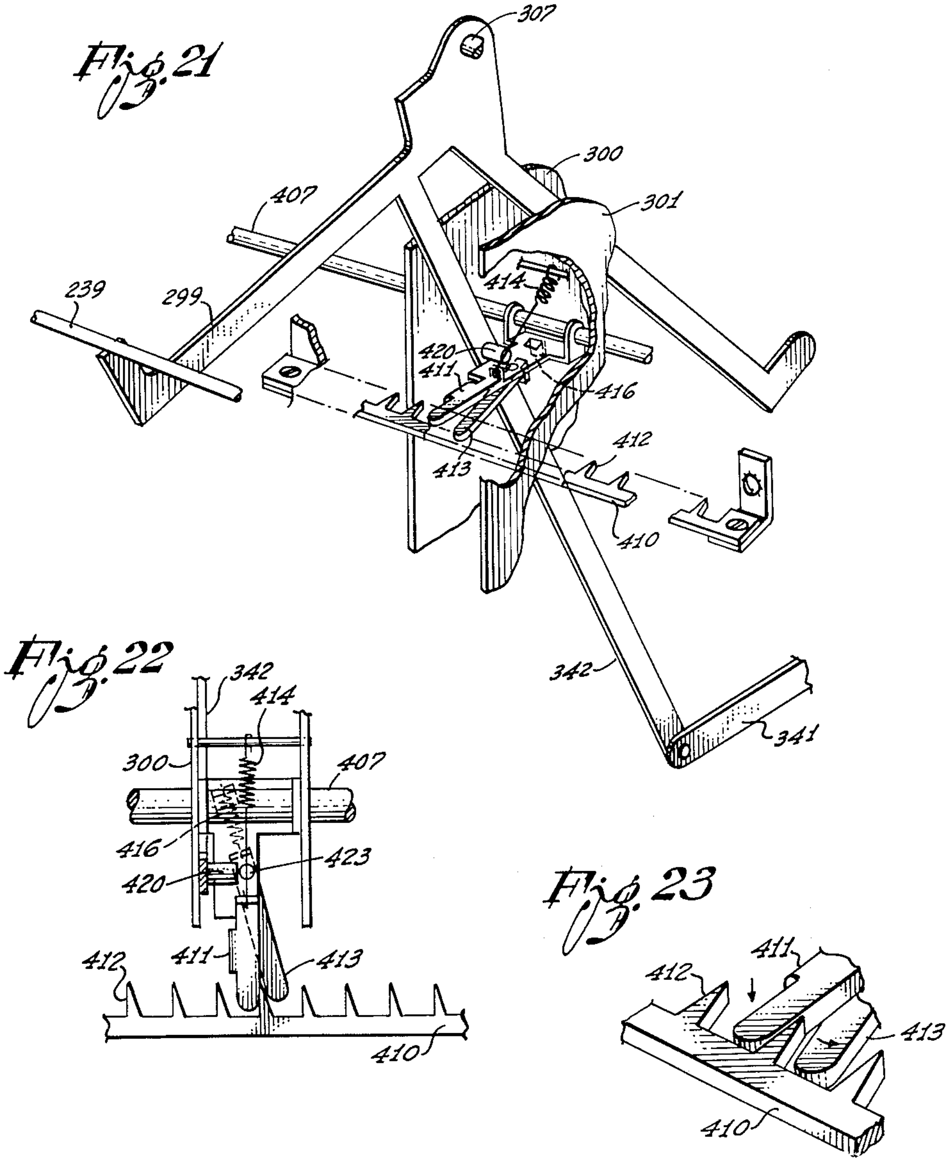
FIGURE 21 is a pictorial view of the stepping apparatus utilized in the operating key mechanism for controlling the digital storage apparatus.
FIGURE 22 is a top view taken along lines 22—22 in FIGURE 7 of the latching mechanism of the travelling selector assembly depicted in FIGURE 21 and in FIGURE 6.
FIGURE 23 is a detailed pictorial view of a portion of the latching mechanism depicted in FIGURES 21 and 22 illustrating its position when a digital code key has been operated.
Figure 24:
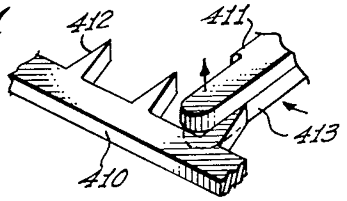
FIGURE 24 is a detailed pictorial view of a portion of the latching mechanism illustrated in FIGURES 21 and 22 with the digital keyboard normal.

The latching member 413 is movable with respect to the latching member 411 being pivoted on a pin 423 (FIGURE 22) and urged by a spring 416 in a counter-clockwise direction as viewed in FIGURE 22. The latching mechanism including the members 411 and 413 is positioned adjacent a stationary notched rack 410 having a plurality of teeth 412 one for each of the code wheels 180 through 194, inclusive. Normally, the latching mechanism is positioned so that the member 411 is just above one of the notches of the rack 410 and the latching member 413 is forced against the perpendicular edge of one of the teeth 412. This position which is the normal position of the latching mechanism is depicted in FIGURE 24. As shown in FIGURES 21 through 23 when the latching mechanism is depressed by the catch lever 299, the lower member 413 clears the bottom of the tooth 412 of the rack 410 and rotates slightly in a counter-clockwise direction to a position adjacent the next notch of the rack 410. The travelling selector assembly 305 does not move along the selector shafts 307 and 407 when the latching mechanism is depressed because the upper latching member 411 is retained against the perpendicular edge of one of the teeth 412. When, however, the catch lever 299 is released, the members 411 and 413 move up rotating about the shaft 407 with one of the teeth 412 slipping between the angularly displaced member 413 and the member 411. When the member 411 moves above the tooth 412 to clear it, it permits the cable 400 (FIGURE 6) to pull the entire selector assembly 305 another step to the right. The latching member 413 is only rotatable in a counter-clockwise direction from its normal position so it halts the movement of the assembly 305 when it reaches the next tooth 412 of the rack 410.

To briefly recapitulate, the latching members 411 and 413 are shown in their normal position in FIGURE 24 with the latching member 413 being forced against one of the teeth 412 of the rack 410 by the tension of the cable 400. When any one of the digital keys 40 through 49 is depressed, the members 411 and 413 are depressed to permit the latching member 413 to clear the lower edge of the tooth 412 so that it rotates through a small angle in a counter-clockwise direction. Thereafter, when the depressed digital key is released, the latching members 411 and 413 are raised with the member 411 being on one side of a tooth 412 and the member 413 being on its opposite side. When the latching member 411 clears the upper edge of the tooth 412, the selector assembly 405 is stepped to the next position and is retained thereat by the latching member 413 which bears against the next tooth 412.

The travelling selector assembly 305 including the selector levers 290 through 298 is in this manner successively stepped adjacent the sets 250 through 264 of stop pins by the successive operation of the digital keyboard 25. At each of the fifteen step positions, the associated one of the fifteen code wheels 180 through 194 is unlatched and permitted to rotate through a selected angular displacement determined at the digital keyboard 25.

As described above, each of the code wheels 180 through 194 is urged in a clockwise direction when viewed in FIGURES 7 and 8. Referring to FIGURES 15 through 20, inclusive, which depict the detail structure of the storage apparatus 28, the resilient means for urging the code wheel 186 is the coil spring 507, briefly mentioned above, which has one end attached to an ear 505 of the code wheel 186 and the other end attached to a stationary bar 526. The spring 507 passes over a pulley 528 which is attached to the rest of the code wheel 186 by means of three rivets 508. The spring 507 urges the code wheel 186 in a clockwise direction, as viewed in FIGURE 15, with the stop member 370 engaging the catch lever 335. When the catch lever 335 is rotated in a clockwise direction to a position indicated by the dash lines, the code wheel 186 is free to rotate in a clockwise direction until halted by one of the stop pins 320 through 328 (FIGURE 7). Each of the code wheels 180 through 194, inclusive, includes such resilient means with the shaft 526 being common thereto.

Figures 15, 16, 17, 18, 19, 20:
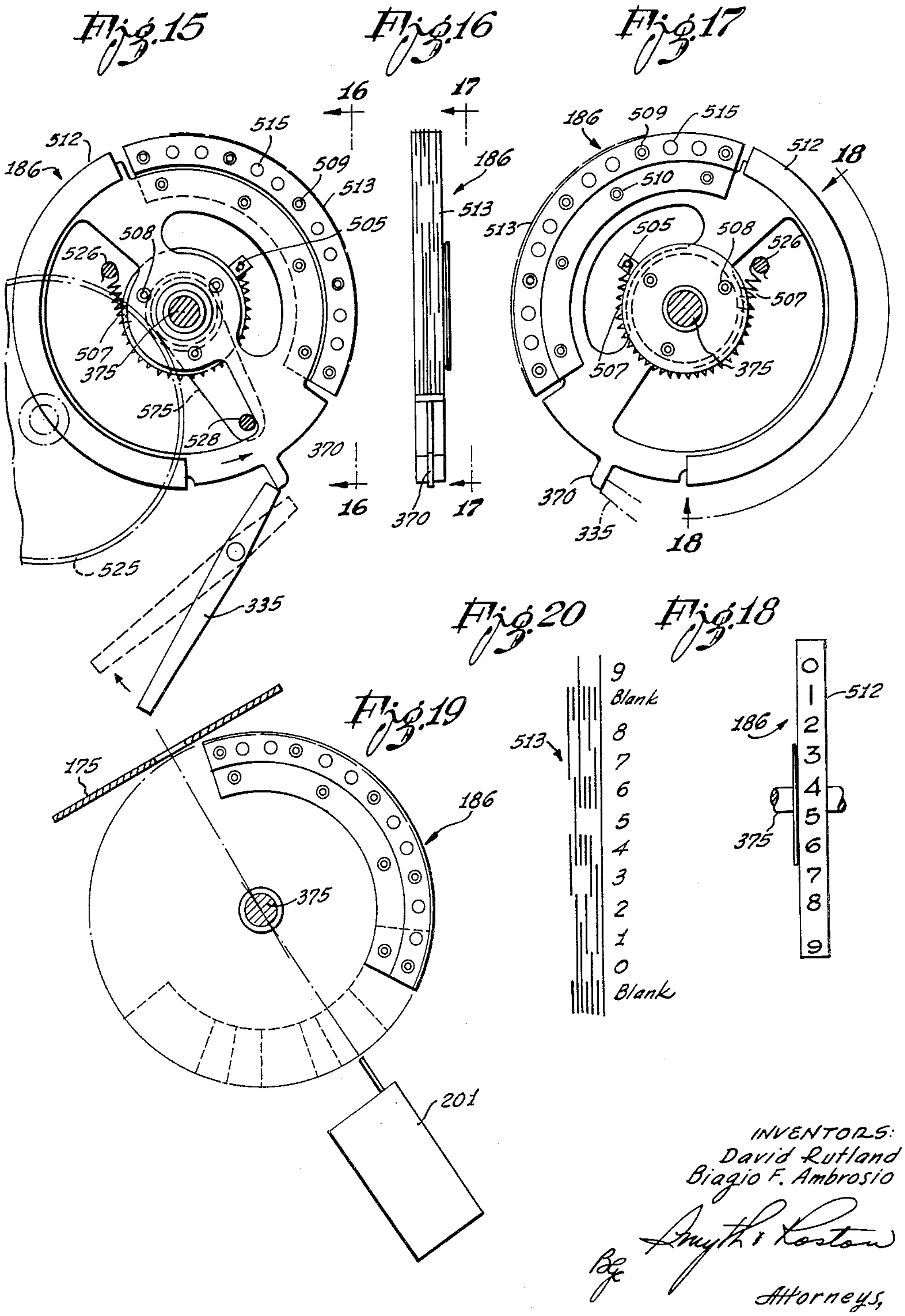
FIGURE 15 is a front view of one of the code wheels of the storage apparatus illustrating its position with respect to some of the components in the storage apparatus.
FIGURE 16 is a side view of the coded wheel taken along lines 16—16 in FIGURE 15.
FIGURE 17 is a rear view of the coded wheel taken along lines 17—17 of FIGURE 16.
FIGURE 18 is a side view of the coded wheel illustrating the peripheral indicating surface thereof.
FIGURE 19 is a front view of the coded disc illustrating its position, when operated, with respect to the message window and the digital scanning head.
FIGURE 20 is a plan view of the peripheral coded surface of the code wheel.

Each of the code wheels 180 through 194 also includes an indicating peripheral surface 512 and a coded peripheral surface 513. As depicted particularly in FIGURE 18, the indicating surface 512 includes the symbols 0 through 9 which are viewed through a window in the plate 175 (FIGURES 19 and 2). As each of the code wheels 180 through 194 is released by the successive operation of the digital keyboard 25, one digit of each indicating surface 512 is positioned adjacent the window of the plate 175 so as to be readily viewable by the operator. At the same time, the coded surfaces 513 of the code wheels 180 through 194 are successively positioned so as to align the coded representations of the selected digits for scanning by the scanning head 201. As illustrated in FIGURES 17 and 20, the coded surface 513 includes 12 elemental areas with ten of the areas being coded and two of the areas being blank. FIGURE 20 is a plan or layout view of the coded surface 513. Each of the vertical lines in FIGURE 20 is a code bar being in the form of a thin strip of magnetic material. As is hereinafter described, the reluctance of a magnetic circuit is sequentially varied by the code bars of the coded surface 513 as the scanning head 201 moves adjacent thereto.

Each of the ten elemental code areas of the coded surface 513 provides for a different and unique coding related to the conventional teletypewriter code. The presence of a magnetic strip or code bar in an elemental area is indicative of a change from a space to mark or vice versa in the teletypewriter code. The elemental areas are scanned from the right to the left as viewed in FIGURE 20 with the digit 4, for example, providing for a pulse wave depicted as curve TP3 in FIGURE 26. The scanning arrangements and further details of the coding of the wheels 180 through 194 is hereinafter described in detail as part of the description of the digital transmission sequence.

Assuming that the coded wheel 186 is operated by the digital key 44 indicative of the digit 4, the numeral 4 on the indicating surface 512 is positioned adjacent the window of the face-plate 175 and the coded elemental area corresponding to the digit 4 is positioned adjacent to the path of the movable scanning head 201 (FIGURE 19). The indicating surface 512 may be made of a plastic and in assembly is forced over the main circular portion of the code wheel. The code surface 513 may be made of a number of plastic and metallic layers which are attached by means of rivets 515. The entire coded surface 513 is then attached by means of rivets 510 to the rest of the code wheel.

With each of the code wheels 180 through 194 positioned by the keyboard 25, they remain thereat until they are manually reset. The code wheels 180 through 194 remain in their code-indicating positions during the digital transmission sequence. After the code information has been stored in the apparatus 28 in this manner, either the functional or the digital transmission sequence may be initiated. The digital storage apparatus 28 is mechanical so that the on-off switch 50 (FIGURES 1 and 2) may be in its off position when the keyboard 25 is operated. Digital scanning is independent, therefore, of the digital selection and takes place when the switch 50 is moved to its on position and the digital transmission key 51 is depressed.

*Digital transmission*

Figure 12:
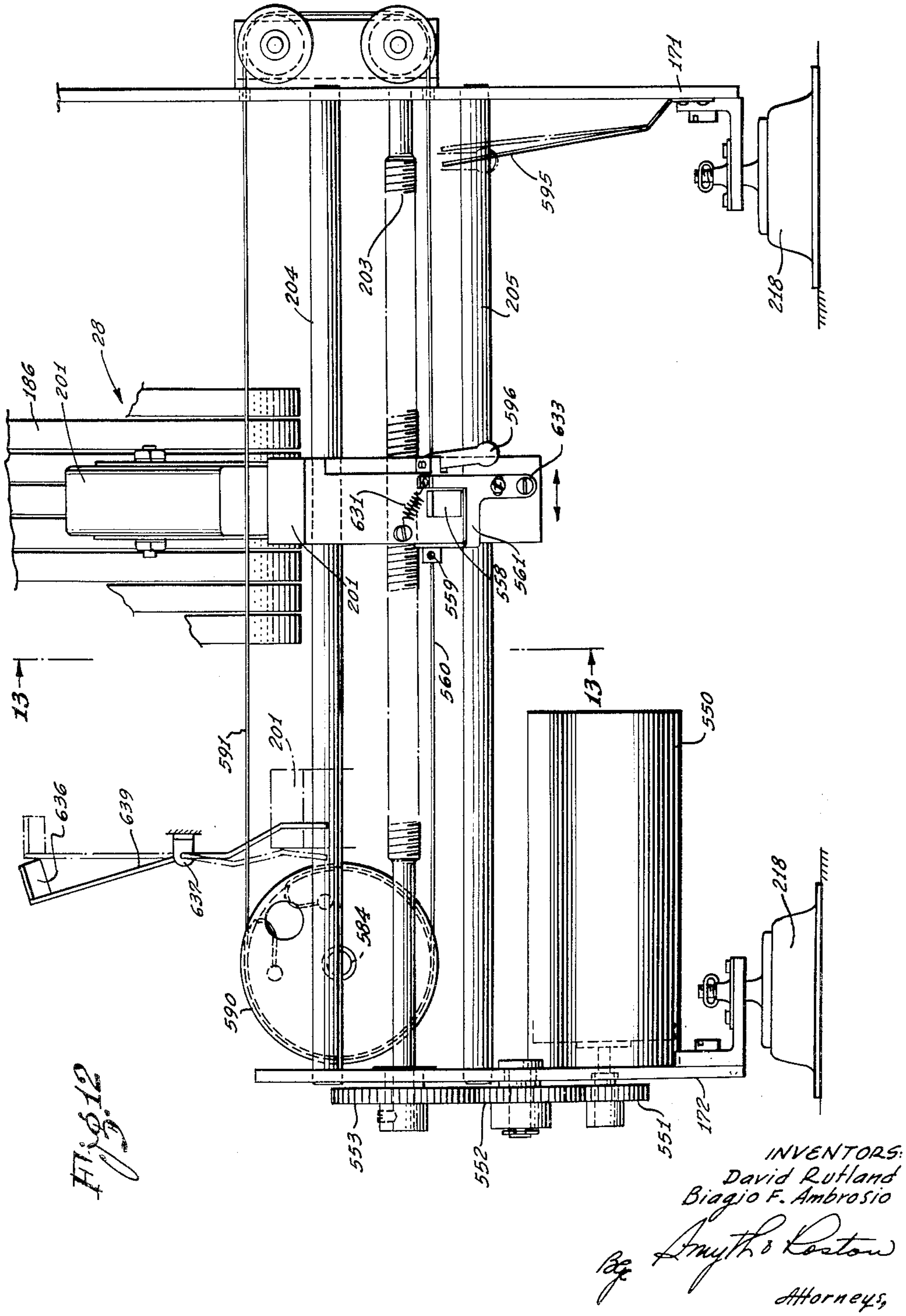
FIGURE 12 is a rear view of the data transmitter with the case removed illustrating the magnetic scanning equipment utilized for the digital data transmission.

When the digital transmission key 51 is depressed, it energizes a digital transmission motor 550 (FIGURES 25) which may be similar to the functional transmission motor 146. The energizing path for the motor 550 is from the battery pack 66 through the switch 50, the limit switch 200, the normal switch 94, and the operated transmission key 51. When the motor 550 is energized, it rotates a lead screw 203 (FIGURES 2, 12, 13 and 14) by means of a gear train including the gears 551, 552 and 553 (FIGURE 12). The idler gear 552 may have 42 teeth to provide for an output transmission speed of 60 words or codes per minute. To change the output speed to 100 words per minute, the 42 toothed idler gear is replaced by a 70 toothed gear. A separate bearing, not shown, in the frame member 172 is utilized for the 70 toothed gear.

The scanning head 201 which is driven by the rotating lead screw 203 travels along two supporting shafts 204 and 205. As shown particularly in FIGURE 14, the scanning head 201 includes a nut segment 558 which engages the lead screw 203. At the end of its travel, the scanning head 201 operates the limit switch 200 (FIGURES 2 and 25) to de-energize the motor 550. At the same time, a stop 559 (FIGURE 14) on the reset cable 560 engages a nut release lever 561 to disengage the nut segment 558 from the lead screw 203 so that the scanning head 201 can be returned to its starting position.

Figures 13, 14:
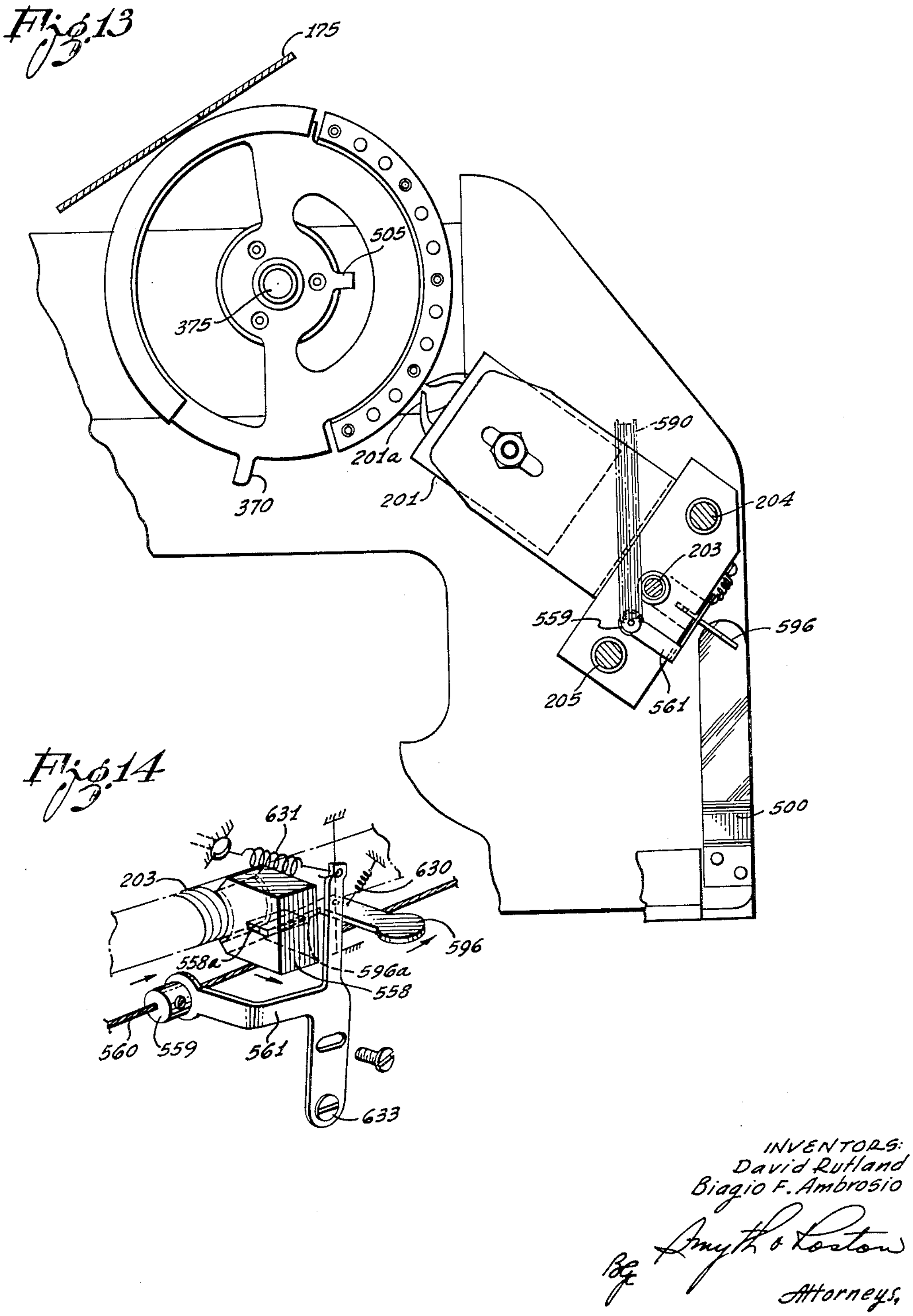
FIGURE 13 is a sectional view taken along lines 13—13 of FIGURE 12 illustrating the arrangement of the digital scanning head with respect to the digital storage apparatus.
FIG. 14 is a pictorial view of a portion of the digital scanning apparatus shown in FIGURE 12 illustrating the coupling to a rotatable lead screw.

The nut segment 558 has a slotted opening **558*a* which engages an arm 596*a* of a pivoted extension 596. The extension 596 is urged in the direction of the arrow in FIGURE 14 by a spring 630. During the transmission sequence, however, the nut segment 558 is engaged by the release lever 561. In FIGURE 14, the next segment 558 is shown in its disengaged position due to the effect of the stop 559 on the reset cab.e 560. The stop 559 rotates the lever 561 about the screw pivot 633 in a clockwise direction to free the nut segment 558. The nut segment is moved away from the lead screw 203 by the arm 596*a* of the extension 596 due to the effect of the spring 640**.

With the nut segment 558 disengaged in this manner, the scanning head 201 is free on the lead screw 203 so that it can be returned to its original position during the reset sequence. When, as is hereinafter described, the scanning head 201 is returned to its original position and a resilient member 595 (FIGURE 12) engages the extension 596 to move the nut segment 558 against the threads of the lead screw 203. The extension 596 also engages the lever 561 to rotate it over the back of the nut segment. The lever 561 in this manner holds the segment 558 against the threads of the lead screw 203 when it is rotated thereafter to move the head 201 to the left. The nut segment 558 remains in engagement with the lead screw 203 until the stop 560 again engages the lever 561.

At the end of the digital transmission interval, just before the nut segment 558 is disengaged, the head 201 contacts and rotates an indicator lever 639 (FIGURE 12). The lever 639 is pivoted in a bracket 637 adjacent the last code wheel 194. A white tab 636 at the end of the lever 639 is rotated into the window of the faceplate 175 (FIGURE 2) when the lever 639 is rotated by the head 201. The white indicator 636 provides a visual indication to the operator that the digital transmission sequence is completed.

As described above, at the end of the transmission sequence, the head 201 operates the limit switch 200 (FIGURES 2 and 25). The limit switch opens the energizing path of the transmission motor 550 to halt the rotation of the lead screw 203. With the limit switch 200 operated, neither of the motors 146 and 550 can be energized until the data transmitter is reset. The limit switch 200 also applies the +6 volt muting signal to the base electrode of the transistor 664 to lock the flip-flop circuit 651 in its space condition.

As described above, during the functional code and digital code transmission sequences, the pulse generated by the functional scanning head 165 and by the digital scanning head 201 are both rectangular shaped pulses. The pulse generated by the head 201 for the digit 4 are illustrated as curve TP3 in FIGURE 26. As illustrated in FIGURE 25, these pulses are introduced from the heads 165 and 201 to a transistor circuit arrangement for converting the pulses to a variable frequency output signal. Before describing the transistor circuitry, consider again briefly the coding provided by the code whee's 180 through 194. The type of coding for both the functional code wheel 140 and the code wheels 180 through 194 is similar though different specific codes are utilized. FIGURE 20 illustrates the coding provided by the code bars in the code area 513 of each of the code wheels 180 through 194. The code wheels are scanned from the right to the left when viewed in FIGURE 20 with a start pulse being provided at the initiation of each code because of the solid code bar running the length of the area 513 at the right. The following table illustrates the wheel coding for the digits 0 through 9 with the corresponding teletypewriter coding provided by the transistor circuitry.

| Digit | Wheel Coding | | | | | | | Teletypewriter Code |
|---|---|---|---|---|---|---|---|---|
| | S | 1 | 2 | 3 | 4 | 5 | 6 | |
| 0 | X | ---- | X | ---- | X | X | ---- | MSSMS. |
| 1 | X | X | ---- | ---- | X | X | ---- | SSSMS. |
| 2 | X | X | ---- | X | ---- | X | ---- | SSMMS. |
| 3 | X | X | X | ---- | ---- | ---- | X | SMMMM. |
| 4 | X | ---- | X | X | X | X | X | MSMSM. |
| 5 | X | ---- | ---- | ---- | ---- | X | ---- | MMMMS. |
| 6 | X | X | X | X | X | X | ---- | SMSMS. |
| 7 | X | X | ---- | ---- | X | ---- | X | SSSMM. |
| 8 | X | ---- | X | ---- | X | ---- | X | MSSMM. |
| 9 | X | ---- | ---- | ---- | X | ---- | ---- | MMMSS. |

An X symbol indicates the presence of a code bar in the elemental area. A maximum possibility of 7 code bars including the start code bar exists but actually only a maximum of six code bars are utilized (digits 4 and 6).

A code bar is provided each time that there is a change from a mark to a space and vice versa in the teletype code. For the digit 4, for example, a code bar is not provided for the first element so that the first element of the code is a mark. For the second through the sixth element, a code bar is provided so that the code changes successively from the mark to a space and then from a space to a mark, etc. The teletypewriter code for the digit 4 is mark-space-mark-space-mark. The sixth space or last place on the coded surface 513 is actually utilized only to return the transistor circuitry to its original condition before the start pulse of the next code because there are only five elements in the teletypewriter code. If the last of the five elements of a particular code is a mark, a code bar is provided for the sixth element.

The pulses generated by the scanning head 201 are somewhat smaller in magnitude than the pulses generated by the functional scanning head 165 because of the slower speed of the scanning head 201 adjacent the code wheels 180 through 194, inclusive, compared to the speed of the functional code wheel 140 adjacent the functional scanning head 165. The functional scanning head output is attenuated by a potentiometer 623 before being added in parallel with the output pulses from the digital scanning head 201. The magnitude of the functional code pulses and the digital code pulses is, therefore, the same as introduced to the transistor circuitry. The pulses from either the scanning head 201 or the scanning head 165 are thereafter processed in exactly the same manner by the transistor circuitry which is depicted in FIGURE 25.

The pulse signals from the heads 201 and 165 are amplified by two similar cascaded transistor amplifiers 625 and 626. The pulses from the heads 201 and 165 are positive pulses with a positive bar on a digital code wheel or each magnetic protrusion on the functional code wheel 140. The positive pulses are phase reversed by each of the transistor amplifiers 625 and 626 so that the pulses at the collector of the NPN transistor 629 in the amplifier 626 are in phase with the input pulses from the scanning heads. The potentiometer 628 between the two transistor amplifiers 625 and 626 provides control of the overall gain provided by the two amplifiers 625 and 626. The positive pulses from the transistor amplifier 626 are clipped or limited by a circuit arrangement including a diode 640. The diode 640 is normally forward biased and a positive potential at the output of the amplifier 626 exceeding the bias reverse-biases the diode 640 to provide for the clipping effect.

The clipped pulses depicted as curve TP2 in FIGURE 26 are introduced to a trigger circuit 644 which includes two NPN junction transistors 642 and 643. The transistor 643 is normally conductive and the transistor 642 is normally non-conductive. The clipped positive pulses coupled through the diode 640 to the base electrode of the transistor 642 reverses the conductive conditions of the two transistors 642 and 643. The trigger circuit 644 functions to sharpen the clipped pulses appearing at the input of the trigger circuit. The output of the trigger circuit 644 is therefore a series of rectangular shaped pulses as illustrated by the curve TP3 in FIGURE 26. The successive positive rectangular shaped pulses from the collector electrode of the transistor 643 in the trigger circuit 644 are utilized to trigger the flip-flop circuit 651 which includes the NPN junction transistors 653 and 655. During transmission, the muting signal at the base electrode of a transistor 644 is removed to inhibit conduction through the transistor 664 to permit the two transistors 653 and 655 in the trigger circuit 651 to operate.

The muting signal, as described above, is in the form of a +6 volt potential. When either of the switches 51 or 94 is operated to initiate a transmission sequence, the transistor 664 becomes non-conductive. The transistor 664 is normally conductive being forward biased by the muting signal from the battery pack 66 over a path through the switch 50 and the switches 200, 94 and 51. The transistor 664 is, therefore, conductive at all times that the switch 50 is closed except during transmission. At the end of the digital transmission sequence, the switch 200 is operated to provide the biasing potential to the transistor 664 over a shunting path around the switches 94 and 51.

The successive pulses developed by the first trigger circuit 644 function to successively set and reset the flip-flop circuit 651. The flip-flop circuit 651 is, therefore, set and reset once for each pair of square shaped positive pulses from the trigger circuit 644. The successive positive pulses are introduced from the trigger circuit 644 to the base electrode of a transistor 656. The collector electrode of the transistor 656 is coupled to the emitter electrodes of two transistors 652 and 658 which control the trigger circuit 651. The collector-to-emitter junctions of the two transistors 652 and 658 are connected in parallel and the parallel arrangement is connected in series with the collector-to-emitter junction of the transistor 656. All three transistors 656, 652 and 658, therefore, simultaneously become conductive during each positive pulse from the trigger circuit 644.

The collector electrodes of the transistors 652 and 658 are coupled respectively to the base electrodes of the transistors 655 and 653 in the bistable trigger circuit 651. One or the other of the two transistors 653 and 655 is conductive as long as the on-off switch 50 is in its on position. When transistors 652 and 658 become conductive, they reverse the conductive conditions of the transistors 653 and 655. The circuit parameters are selected so that the transistor 655 is normally conductive. The first positive pulse from the circuit 644 triggers the circuit 651 to cause the transistor 655 to become non-conductive to develop a positive pulse on the lead 668. The potential on the lead 668 remains relatively positive until the trigger circuit 651 is triggered by the next positive pulse from the trigger circuit 644.

The signals through lead 668 are utilized to modulate the frequency of a Colpitts type transistor oscillator 672 including the transistor 675 by switching a capacitor 674 into the tuned circuit 670. The oscillator 672 is free-running and its frequency is determined by the circuit 670. When a positive signal is provided on the lead 668, a transistor 671 becomes conductive to effectively switch the capacitor 674 into the tuned circuit 670 by coupling it across the transistor 675. The circuit 670 forms the collector circuit of the transistor 675.

When the transistor 671 is conductive, the capacitor 674 functions to decrease the frequency of oscillation from 1325 cycles per second to 1225 cycles per second. This frequency shift is provided only during the time a positive pulse is present at the lead 668 from the flip-flop circuit 651. The signal from the oscillator 672 is amplified by three transistors 686, 676 and 677. The transistors 676 and 677 are coupled to the transistor 686 by a transformer 67. The output level is determined by a resistor 674 which is connected in a feedback loop across the three transistors 686, 676 and 677. The amplified varying frequency signal is coupled through two transistors 680 and 681 across two resistors 684 and 683 which are utilized in the output circuit to attenuate the signal to a predetermined level. The output signal for the digit 4 is depicted in FIGURE 6 across the terminals 500. The cable connector 501 is utilized to couple the frequency modulated signals from the data transmitter to a radio transmitter and the terminals 500 are utilized for connection to telephone wires.

*Manual reset*

As the digital transmission sequence is completed, it is necessary to reset the data transmitter in order to transmit either additional functional or digital information. Only the mechanisms controlling digital selection and scanning require resetting after the code transmission but neither of the two motors 146 or 200 can be operated until the transmitted digital message is cleared because of the operation of the switch 200. Functional transmission, therefore, cannot be performed before the data transmitter is reset.

In order to reset the data transmitter, the digital code wheels 180 through 194, inclusive, are returned to their initial position, the travelling selector assembly 305 is returned back to its position in front of the first code wheel 180, the displaced stop pins in the sets 150 through 164, inclusive, are moved back to normal and the digital scanning head 201 is moved back to its starting position on the lead screw 203. All of these operations are performed simultaneously when the reset disc 36 in FIGURE 1 is rotated 90 degrees in a counter-clockwise direction. A grip extension 37 on the disc 36 is utilized to facilitate the rotation thereof. The reset disc is spring loaded tensing a spring 565 (FIGURE 6) when it is rotated. The spring 565 is attached to a lever 566 in turn affixed to a reset shaft 567 which supports the disc 36. When the reset shaft 567 is rotated, it drives a train of gears including a small gear 570 and a large gear 525. The large gear 525 drives a pinion 571 which is mounted on the code wheel shaft 375. The pinion 571 is attached to a reset bar 528 by means of a lever 575. The reset bar 528 is supported between the lever 575 and another similar lever 572 at the opposite side of the storage apparatus 28. When the pinion 571 rotates, it rotates therewith the lever 575 and the reset bar 528. The reset bar 528 is rotated in a counter-clockwise direction when viewed in FIGURE 15 so that its returns the displaced code wheel to its original position also indicated in FIGURE 15. The stop member 370 engages the catch lever 335 which was released when the travelling assembly 305 stepped to the next position. When the reset bar 528 is returned to normal, the code wheels remain latched in their normal position by the catch levers 335. The reset bar 528 by means of the lever 572 rotates a pinion 576 to drive a gear 577. The gears 525 and 577 are similar and the pinions 570 and 576 are similar. The two gears 525 and 577 move the reset platform 331 (FIGURE 6) to return the displaced stop pins to their original positions.

The reset shaft 657 also drives two sets of bevel gears including the common bevel gear 580 and two bevel gears 581 and 582. The gear 582 rotates a front reset shaft 583 and the gear 581 rotates a back reset shaft 584. The front reset shaft 583 rotates a pulley 585 which, by means of a cable 587 and a stop 587*a*, returns the travelling selector assembly 305 back to its original position against the spring action of the torsion spring 402. As indicated above in reference to FIGURES 21 through 24, inclusive, the latching members 411 and 413 permit the travelling assembly 305 to move to the left because the latching member 413 is rotatable in a counter-clockwise direction. The latching member 411 is not depressed because none of the digital keys are operated at this time so that it does not engage any of the teeth 412 on rack 410. As the assembly 305 is moved to the left, each tooth 412 engages and rotates the lower link member 413 until it clears the tooth and clicks into the next notch. In order to advance the assembly 305 to the right, it is necessary to step it again under control of the digital keyboard 25.

The back reset shaft 584 (FIGURES 6 and 12) rotates the reset pulley 590 to return the scanning head 201 back to its starting position at the right. The pulley 590 drives the cable 591 which in turn forces the stop 559 against the head 201. As described above, the scanning head 201 if free to move along the stationary lead screw 203 due to the release of the nut segment 558 (FIGURE 14) at the end of its travel to the left. The nut segment 558 re-engages the lead screw 203 at the end of its travel to the right under control of the resilient member 595 which contacts the lever extension 596 of the scanning head 201. The extension 596 returns the nut segment 558 against the lead screw 203 so that when the lead screw 203 is again rotated, the scanning head 201 is moved to the left.

In this manner, the scanning head 201 is returned to its original position with the assembly 305 and digital storage apparatus 28 so that another selection and storage or functional transmission sequence can be initiated. When the head 201 is returned to normal, it releases the switch 200 to permit the re-energization of either of the motors 146 and 550. When the reset disc 36 (FIGURES 1 and 6) is released, it is returned to its original position by the spring 565 but the various members in the data transmitter which were reset thereby remain in their reset pos tions.

Although this application has been disclosed and illustrated with reference to particular applications, the principles involved are susceptible of numerous other applications which will be apparent to persons skilled in the art. The invention is, therefore, to be limited only as indicated by the scope of the appended claims.

We claim:

1. A key-operated data transmitter, including, a first input keyboard for successively registering data to be transmitted, means coupled to said input keyboard for storing and providing a visual indication of the registered data to be transmitted, a second input keyboard for initiating the transmission of data without storage by said storing and providing means during the time data is stored in said storing and providing means, means associated with said second keyboard for converting the operations of said second keyboard to electrical signals representing such operations, scanning means associated with said storing and providing means for generating electrical signals in accordance with the stored data, and means for inhibiting the operation of said scanning means during the time said converting means is operative to provide electrical signals.

2. A keyboard-operated data transmitter, including, a first input keyboard for successively registering data to be transmitted, means coupled to said input keyboard for storing and providing a visual indication of the registered data to be transmitted, said storing means including a plurality of rotatable information members, means for concentrically supporting said information members, a travelling selector assembly positionable adjacent any one of said rotatable information members for initiating the rotation thereof, said travelling selector assembly including means for limiting the rotation of said information member adjacent which it is positioned in accordance with a key operation, and means coupled to said assembly and responsive to the successive key operations of said first input keyboard for successively stepping said assembly adjacent said information members whereby said information members are successively rotated through angular displacements related to the key operations.

3. A key-operated data transmitter, including, a first input keyboard for successively registering data to be transmitted, means coupled to said input keyboard for storing and providing a visual indication of the registered data to be transmitted, said storing means including a plurality of rotatable information members, means for concentrically supporting said information members, a travelling selector assembly positionable adjacent any one of said rotatable information members for initiating the rotation thereof, said travelling selector assembly including means for limiting the rotation of said information member adjacent which it is positioned in accordance with a key operation, and means coupled to said assembly and responsive to the successive key operations of said first input keyboard for successively stepping said assembly adjacent said information members whereby said information members are rotated through angular displacements related to the key operations, a second input keyboard for initiating the transmission of data without storage by said storing and providing means during the time data is stored in said storing and providing means, means associated with said second keyboard for converting the operations of said second keyboard to electrical signals representing such operations, scanning means associated with said storing and providing means for generating electrical signals in accordance with the stored data, and means for inhibiting the operation of said scanning means during the time said converting means is operative to provide electrical signals.

4. A keyboard operated data transmitter, including, a plurality of movable coded members for storing coded information to be transmitted each having a number of code positions, a keyboard for successively selecting coded information to be transmitted, stepping means responsive to the successive operation of said keyboard for successively coupling said keyboard to the movable coded members of said plurality and for positioning said coded members in accordance with the coded information selected at said keyboard, and means sequentially movable adjacent said positioned coded members for providing an electrical signal representing the coded information stored thereby, said coded members each including a plurality of coded magnetic bars arranged to provide a different combination of said bars at each code position of said movable coded members, said electrical signal providing means including a magnetic head for sequentially scanning selected ones of said bars of each of said movable code members positioned along the path of movement of said head, said stepping means including means for limiting the motion of said movable member in accordance with the keyboard operation, and means effective after each operation of said limiting means for initiating the movement of the movable member to which said keyboard is coupled.

5. A keyboard operated data transmitter, including, a plurality of movable coded elements for storing coded information to be transmitted, key operated means including a plurality of keys for successively selecting coded information to be transmitted, means coupled to said key operated means and responsive to the operation of some of said keys for successively positioning said movable coded elements in accordance with the information indicated by the operated keys, and means coupled to said movable coded elements for scanning said positioned coded elements and to generate electrical signals representing the positions of said coded elements, means coupled to said key operated means and responsive to the operation of others of said keys for instantaneously developing coded electrical signals representing the key operations of said other keys, and means for transmitting said electrical signals from said scanning and generating means and from said developing means.

6. A keyboard operated data transmitter in accordance with claim 5 including in addition, latching means associated with each of said coded elements for maintaining said elements in the positions to which they are moved by said positioning means during the operation of said instantaneous developing means whereby the instantaneous transmission of signals can either precede or follow the storage positioning operation by said positioning means.

7. Storage apparatus including a plurality of rotatable code members each having magnetic code bars forming different coding arrangements, means for rotatably supporting said code members so that at least one of said coding arrangements of each of said code members are aligned in a row, means for successively rotating said rotatable code members in accordance with successive information to be stored so that one coding arrangement indicating the information is aligned in the row, a movable magnetic head for developing signals representing the coding of the aligned arrangements, and means for moving said head along the aligned row of coding arrangements of said code members, said means for successively rotating said code members including a travelling selector assembly positionable adjacent any one of said rotatable coded members for initiating the rotation thereof, and key operated means for successively positioning said selector assembly adjacent said rotatable coded members and for operating said selector assembly at each position to rotate said code member adjacent which it is positioned through an angular displacement determined by the key operations of said key operated means.

8. A data transmitter including a plurality of code wheels, each having magnetic code bars positioned along its peripheral surface, means for concentrically and individually supporting said plurality of code wheels so that their peripheral surfaces are longitudinally aligned, a magnetic scanning head movable longitudinally along portions of the aligned surfaces of said code wheels, means coupled to said code wheels for successively rotating said code wheels to angular positions indicative of coded information to be transmitted, means coupled to said scanning head for developing electrical signals in accordance with the particular code bars of said code wheels which said magnetic head is moved adjacent to an axially movable and rotatable additional code wheel, control means coupled to said additional code wheel for first axially positioning said additional code wheel in accordance with a code to be transmitted and then for rotating said additional code wheel to transmit the code registered by its axial position, and a stationary magnetic scanning head positioned adjacent the periphery of said additional code wheel for generating signals responsive to its rotation, said control means being operable after the operation of said successive rotating means and before the movement of said first-mentioned head without affecting the code registration by the positioned plurality of code wheels.

9. A data transmitter in accordance with claim 8 wherein said control means including means for rotating said additional code wheel through a single revolution during the time said first-mentioned head is moved adjacent one of the positioned plurality of code wheels.

10. A key-operated data transmitter, including, a first input keyboard for successively registering data to be transmitted, means coupled to said input keyboard for storing and providing a visual indication of the registered data to be transmitted, said storing means including a plurality of rotatable information members, means for concentrically supporting said information members, a travelling selector asssembly positionable adjacent any one of said rotatable information members for initiating the rotation thereof, said travelling selector assembly including means for limiting the rotation of said information member adjacent which it is positioned in accordance with a key operation, means coupled to said assembly and responsive to the successive key operations of said first input keyboard for successively stepping said assembly adjacent said information members whereby said information members are successively rotated through angular displacements related to the key operations, scanning means positioned relative to said information members for successively determining the angular displacements of said information means, a movable indicator tab, and means responsive to the operation of said scanning means for moving said indicator to a readily visible position to provide an indication of the termination of the scanning operation.

11. A data transmitter including a plurality of code wheels, each having magnetic code bars positioned along its peripheral surface, means for concentrically and individually supporting said plurality of code wheels so that their peripheral surfaces are longitudinally aligned, a magnetic scanning head movable longitudinally along portions of the aligned surfaces of said code wheels, means coupled to said code wheels for successively rotating said code wheels to angular positions indicative of coded information to be transmitted, means coupled to said scanning head for developing electrical signals in accordance with the particular code bars of said code wheels which said magnetic head is moved adjacent to an axially movable and rotatable additional code wheel, control means coupled to said additional code wheel for first axially positioning said additional code wheel in accordance with a code to be transmitted and then for rotating said additional code wheel to transmit the code registered by its axial position, and a stationary magnetic scanning head positioned adjacent the periphery of said additional code wheel for generating signals responsive to its rotation, said control means including means for rotating said additional code wheel at a particular speed related to the speed of said first-mentioned head during its motion along said plurality of code wheels.

12. A data transmitter in accordance with claim 11, including, in addition, means for receiving the signals from said stationary head and from said developing signals and for adjusting their relative magnitudes so that they are at substantially similar levels.

13. A key-operated data transmitter, including, a first input keyboard for successively registering data to be transmitted, means coupled to said input keyboard for storing and providing a visual indication of the registered data to be transmitted, a second input keyboard for initiating the transmission of data without storage by said storing and providing means during the time data is stored in said storing and providing means, means associated with said second keyboard for converting the operations of said second keyboard to electrical signals representing such operations, scanning means associated with said storing and providing means for generating electrical signals in accordance with the stored data, said converting means including cyclically operating means which terminate its operation at the starting point for the next operation so that successive operations of said second keyboard can be provided without a resetting operation, and means coupled to the scanning and providing means and responsive after the operation of said scanning and providing means for inhibiting the operation of said converting means.

14. A key-operated data transmitter in accordance with claim 13, including, in addition, manual reset means for resetting said scanning means and said inhibiting means.

References Cited in the file of this patent

UNITED STATES PATENTS

| | | |
|---|---|---|
| 2,389,247 | Dowey | Nov. 20, 1945 |
| 2,855,585 | Quinby | Oct. 7, 1958 |
| 2,921,142 | Tinus | Jan. 12, 1960 |

UNITED STATES PATENT OFFICE
CERTIFICATE OF CORRECTION

Patent No. 3,016,423 January 9, 1962

Biagio F. Ambrosio et al.

It is hereby certified that error appears in the above numbered patent requiring correction and that the said Letters Patent should read as corrected below.

In the grant, lines 3 and 4, for "The Electrada Corporation, of Culver City, California, a corporation of Delaware," read -- Biagio F. Ambrosio, of Tarzana, California, --; line 13, for "The Electrada Corporation, its successors" read -- Biagio F. Ambrosio, his heirs --; in the heading to the printed specification, lines 5 and 6, for "The Electrada Corporation, Culver City, Calif., a corporation of Delaware" read -- Biagio F. Ambrosio, Tarzana, Calif. --.

Signed and sealed this 25th day of October 1966.

(SEAL)
Attest:

ERNEST W. SWIDER
Attesting Officer

EDWARD J. BRENNER
Commissioner of Patents